United States Patent
Sekine

(10) Patent No.: US 9,122,107 B2
(45) Date of Patent: Sep. 1, 2015

(54) LIQUID CRYSTAL DISPLAY DEVICE

(71) Applicant: NLT Technologies, Ltd., Kanagawa (JP)

(72) Inventor: Hiroyuki Sekine, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 0 days.

(21) Appl. No.: 14/056,646

(22) Filed: Oct. 17, 2013

(65) Prior Publication Data

US 2014/0111719 A1 Apr. 24, 2014

(30) Foreign Application Priority Data

Oct. 19, 2012 (JP) ................................ 2012-231866

(51) Int. Cl.
*G02F 1/1343* (2006.01)
*G02F 1/1362* (2006.01)
*G02F 1/1335* (2006.01)

(52) U.S. Cl.
CPC .... *G02F 1/134309* (2013.01); *G02F 1/134363* (2013.01); *G02F 1/136286* (2013.01); *G02F 1/133526* (2013.01)

(58) Field of Classification Search
USPC .......................................... 349/141, 145, 146
See application file for complete search history.

(56) References Cited

U.S. PATENT DOCUMENTS

| 5,953,148 | A | * | 9/1999 | Moseley et al. | ............... | 359/237 |
| 8,477,279 | B2 | * | 7/2013 | Song | .............................. | 349/146 |
| 2003/0043327 | A1 | * | 3/2003 | Aoyama et al. | ............... | 349/141 |
| 2004/0183977 | A1 | * | 9/2004 | Kitagawa et al. | ............. | 349/141 |
| 2010/0110358 | A1 | * | 5/2010 | Um et al. | ....................... | 349/141 |
| 2011/0187948 | A1 | * | 8/2011 | Kashiwagi et al. | ............. | 349/15 |
| 2013/0300721 | A1 | * | 11/2013 | Inoue | ............................ | 345/204 |

FOREIGN PATENT DOCUMENTS

| JP | 10-186294 A | 7/1998 |
| JP | 2002-323706 A | 11/2002 |
| JP | 2006-030512 A | 2/2006 |
| JP | 2008-092361 A | 4/2008 |
| JP | 2008-249887 A | 10/2008 |

* cited by examiner

*Primary Examiner* — Dung Nguyen
*Assistant Examiner* — Shan Liu
(74) *Attorney, Agent, or Firm* — Sughrue Mion, PLLC

(57) ABSTRACT

A liquid crystal display device is constituted such that sub-pixels are disposed in an array form in a first direction and a second direction orthogonal to each other, a plurality of gate lines are disposed in the second direction, an optical element for distributing the light to the second direction is disposed on the liquid crystal display device, liquid crystal molecules of the liquid crystal display device are controlled by an electric field almost in parallel to the surface of the liquid crystal display device, and a data line is disposed to obliquely divide the sub-pixels at a position different from the boundary between the sub-pixels neighboring in the second direction, where the data line can have a small angle with respect to the second direction, and the numerical aperture is not deteriorated greatly even when the lengths of apertures of the sub-pixels in the first direction are constant.

8 Claims, 33 Drawing Sheets

FIG. 21
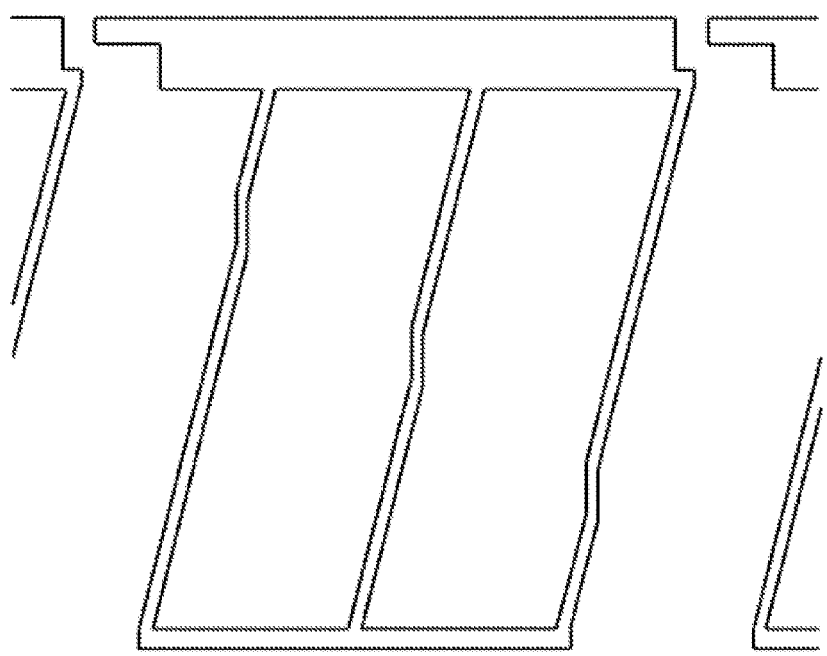
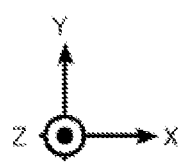

FIG. 22
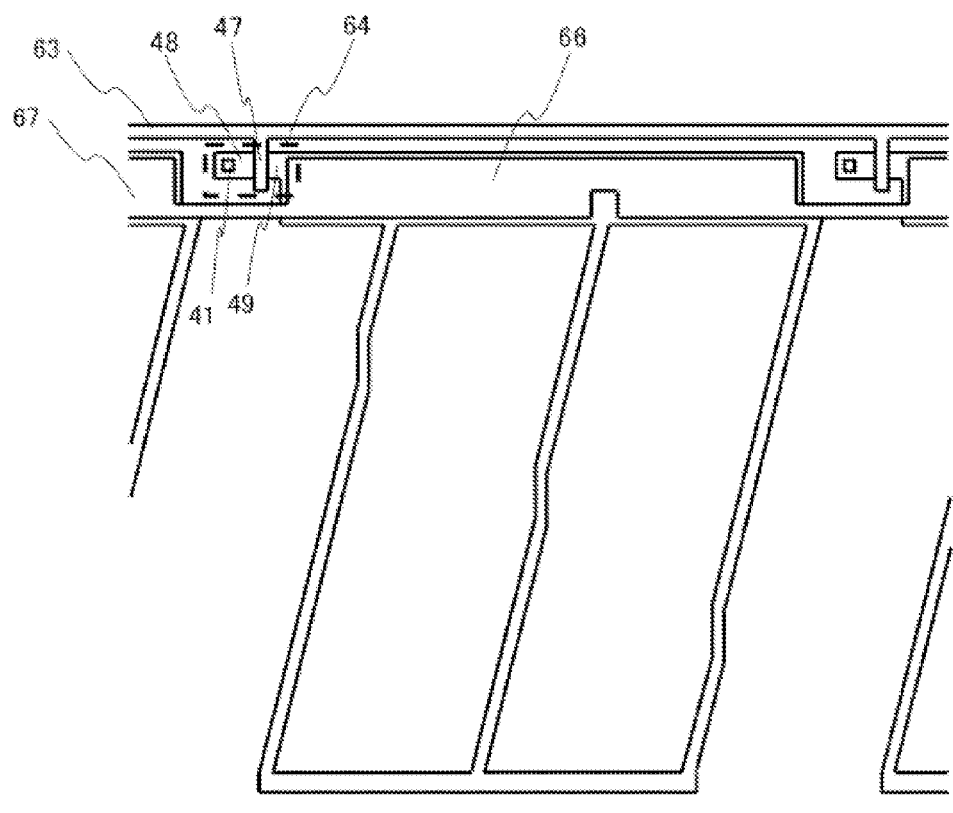
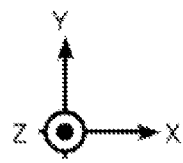

LIQUID CRYSTAL DISPLAY DEVICE

CROSS-REFERENCE TO RELATED APPLICATION

This application is based upon and claims the benefit of priority from Japanese patent application No. 2012-231866, filed on Oct. 19, 2012, the disclosure of which is incorporated herein in its entirety by reference.

BACKGROUND OF THE INVENTION

1. Field of the Invention

The present invention relates to a liquid crystal display device and, more specifically, to a liquid crystal display device which displays three-dimensional videos.

2. Description of the Related Art

Recently, there has been a rapidly increasing demand for a display capable of displaying three-dimensional videos, i.e., so-called 3D videos. A large number of researches and studies on the techniques for displaying the three-dimensional videos have been done from the past, and studies and developments thereof are actively conducted at present as well. Among those, one of the techniques considered as most potential currently is the technique using binocular parallax.

Three-dimensional video display devices using the binocular parallax are almost classified into two types. One is a type which shows different videos for the left and right eyes by using exclusively-used eyeglasses (referred to as "eyeglass type" hereinafter). The other is a type which spatially separates and displays light of different images for the left and right eyes outputted from a three-dimensional video display device without using exclusively-used eyeglasses (referred to as "naked-eye type" hereinafter).

The former eyeglass type is the type that is suited for a case where a plurality of observers view a relatively large screen simultaneously, and it is used in movie theaters, for television sets, and the like. The latter naked-eye type is the type suited for a case where a single observer views a relatively small screen. The naked-eye type is free from the use of the exclusively-used eyeglass and enables the observer to view three-dimensional videos easily, so that it is expected to be applied for displays of mobile terminals, digital still cameras, video cameras, and notebook-type computers.

As an example of the naked-eye type liquid crystal display device capable of displaying three-dimensional videos, there is a structure disclosed in Japanese Unexamined Patent Publication 2006-030512 (Patent Document 1). As shown in FIG. 27, Patent Document 1 discloses the liquid crystal display device in which: 3×3 pixels are disposed in a matrix form in the X-axis direction and the Y-axis direction; and a single pixel 6 is constituted with six sub-pixels 61 (RR, RL, GR, GL, BR, BL). In the liquid crystal display device, two color images constituted with light of R (Red), G (Green), and B (Blue) are shown on the single pixel 6 constituted with the six sub-pixels 61 for the left eye and the right eye of an observer. The sub-pixel RR displays a red image for the right eye, the sub-pixel RL shows a red image for the left eye. Similarly, the sub-pixels GR, GL, BR, and BL show a green image for the right eye, a green image for the left eye, a blue image for the right eye, and a blue image for the left eye, respectively. In FIG. 27, a part of gate lines G1 to G9 and a part of data lines D1 to D6 are illustrated.

As shown in FIG. 28 and FIG. 29, the liquid crystal display device employs the structure in which a lens array sheet 3 having cylindrical lenses 31 with a pitch PL being arranged in array in the X-axis direction is disposed on a liquid crystal panel 2 having a matrix of pixels arranged in the X-axis direction and the Y-axis direction with a pitch PP. Further, as shown in FIG. 29, red light for the right eye emitted from the sub-pixel RR is radiated to a space ZR by the cylindrical lens 31. Similarly, red light for the left eye is radiated to a space ZL by the cylindrical lens 31. When the right eye 9R of the observer is set in the space ZR and the left eye 9L is set in the space ZL, the observer sees only the image for the right eye with the right eye 9R and see only the image for the left eye with the left eye 9L. Thus, the observer can visually recognize the image displayed on the liquid crystal display device as a three-dimensional video. In FIG. 29, light-shielding sections 80 are illustrated between the sub-pixels.

Further, this liquid crystal display device is also capable of displaying two-dimensional videos through displaying same images on the sub-pixels for the right eye and the sub-pixels for the left eye. Considering such current circumstances that the apparatuses for displaying images do not always display three-dimensional videos and that the proportion of displaying the three-dimensional videos is smaller, it is important to be able to display two-dimensional videos in terms of the practical use. Further, for displaying the two-dimensional videos, it is also required to have a wide viewing angle property with which displayed videos are viewed as same even when the liquid crystal display device is observed from any angles of directions.

However, with the liquid crystal display device disclosed in Patent Document 1 described above, there is such an issue that moiré is likely to be visually recognized when two-dimensional videos are displayed. Further, there is no consideration being taken to satisfy the demand for improving the viewing angle property.

Next, the mechanism for generating moiré will be described. A cylindrical lens exhibits no lens effect for the axial direction of the lens but exhibits the lens effect for the direction at an acute angle with respect to the axis. In the case of FIG. 28, the axis direction of the cylindrical lens 31 is the Y-axis direction, and the direction at an acute angle with respect to the axis is the X-axis direction. As shown in FIG. 29, when the liquid crystal panel 2 is disposed in the vicinity of the focal point of the cylindrical lens 31, the light emitted from the liquid crystal panel 2 is projected to the direction tilted with respect to the Z-axis. The angle thereof is determined according to the relation between the vertex of the cylindrical lens 31 and the position of the X-axis of the liquid crystal panel 2. Therefore, in a case where the intensity of the light emitted from the liquid crystal panel 2 varies depending on the position of the X-axis, the extent of the light in terms of the intensity varies depending on the angles at which the light is emitted. That is, in a case where the light-shielding section 80 that does not radiate the light exists on the liquid crystal panel 2 and the light-shielding section 80 is extended in the Y-axis direction, there is no light existing in the direction of a certain angle radiated from cylindrical lens 31, which is visually recognized as black. This is the mechanism for generating the moiré. Completely the same phenomenon occurs even in a case where a parallax barrier is used instead of the cylindrical lens 31.

The light-shielding section described above is located between two sub-pixels disposed neighboring to each other in the X-axis direction of the liquid crystal panel. Thus, the region visually recognized as black is located between the region where the left-eye image is projected and the region where the right-eye image is projected. When the liquid crystal display device is displaying a three-dimensional video, the observer moves the face so that the left eye and the right eye come to be at appropriate positions, respectively, in order to be able to visually recognize the image as the three-dimensional video. However, when the liquid crystal display device is displaying a two-dimensional video, the observer cannot sense the appropriate positions. Thus, there may be cases where the eyes are located at the region visually recognized as black depending on the position of the face, which may deteriorate the display quality greatly.

As a technique for suppressing the moiré, there is a technique disclosed in Japanese Unexamined Patent Publication Hei 10-186294 (Patent Document 2). FIG. 30 shows subpixels 61 of the liquid crystal display device capable of displaying three-dimensional videos disclosed in Patent Document 2. As described above, the moiré is generated because the intensity of the light emitted from the liquid crystal panel changes depending on the position of the X-axis. The intensity of the light emitted from the liquid crystal panel according to the position of the X-axis is equivalent to the ratio between the aperture section and the light-shielding section when the aperture section of the liquid crystal panel is cut in the Y-axis direction at the position of the X-axis. Thus, in order to overcome the moiré, the ratio between the aperture section and the light-shielding section may be set as constant regardless of the positions in the X-axis direction. Regarding the sub-pixels 61 disclosed in Patent Document 2, the light-shielding section extending in the Y-axis direction is tilted at an angle θ with respect to the X-axis. Provided that the width of the oblique light-shielding section is e, the width d of the light-shielding section in the Y-axis direction can be expressed with a following expression.

$$d = e/\cos \theta \quad [1]$$

The width of the aperture section in the part where the oblique light-shielding section exists is the sum of the widths b and c. When sides Et and Eb which define the aperture section are in parallel, the sum of the widths b and c becomes constant regardless of the positions in the X-axis direction. In the meantime, in the region where there is no oblique light-shielding section, the width a of the aperture section becomes constant regardless of the position in the X-axis direction and becomes equivalent to the sum of the widths b and c by setting the width f to be equivalent to the width d when the sides Et' and Eb which define the aperture section are in parallel. Note that sides E1, E1', and Er are parallel to each other.

Further, as another structure for suppressing the moiré disclosed in Patent Document 2, there is a pixel layout shown in FIG. 31. In this layout, a pixel displaying a same signal is divided into two sub-pixels SP1 and SP2, and a data line 62 is disposed between those. There is a limit for set for reducing the width of the data line 62 in terms of the manufacture process, so that it is difficult to reduce the width e in the case of FIG. 30. This causes an issue of deteriorating the numerical aperture. However, in the case of FIG. 31, it is possible to set an angle θ2 to be small for the Y-axis of the light-shielding section in the part where the data line 62 is disposed with respect to an angle θ1 for the Y-axis of the light-shielding section in the boundary part of the neighboring pixels. Therefore, it is possible with this to reduce the deterioration in the numerical aperture.

As the techniques for suppressing the moiré, there are various methods (Japanese Unexamined Patent Publication 2008-092361 (Patent Document 3) and Japanese Unexamined Patent Publication 2008-249887 (Patent Document 4)) other than the technique disclosed in Patent Document 2.

As a technique for acquiring a wide viewing angle property with the liquid crystal display device, there is a technique using an IPS (In-Plane Switching) mode. The IPS mode controls the director direction of liquid crystal molecules with an electric field in parallel to the surface of a substrate which constitutes the liquid crystal display device. The directors of the liquid crystal molecules move in parallel to the electric field and hardly move in the normal direction of the substrate surface. Therefore, this mode exhibits such a characteristic that the viewing angle property thereof is essentially better than other modes.

Normally, in the IPS-mode liquid crystal display device, a common electrode that is in common to all the sub-pixels and pixel electrodes of each of the sub-pixels are arranged on a same substrate in a comb-like form, and liquid crystal molecules are controlled with the electric fields generated between those electrodes. A specific voltage is applied to the common electrode, and signal voltages according to the videos to be displayed are applied to the pixel electrodes of the individual sub-pixels. In order to write the signal voltages, a TFT (Thin Film Transistor) in which the source electrode is connected to the data line, the drain electrode is connected to the pixel electrode, and the gate electrode is connected to the gate line is disposed in each sub-pixel. Through supplying a signal voltage to the data line while the voltage of the gate line is set as a voltage with which the TFT is in a conductive state, the signal voltage is written to the pixel electrode.

As described, with the IPS mode, the liquid crystal molecules are controlled with the electric field generated between the common electrode and the pixel electrodes. Thus, when the electric field between the common electrode and the pixel electrodes is influenced by the electric field from the gate line or the data line, faults such as crosstalk and the like occur. Particularly, the potential of the data line fluctuates according to the videos to be displayed, so that it is necessary to shield the electric field radiated from the data line at least in order to prevent the faults such as the crosstalk and the like. Regarding the shielding technique, there is a technique disclosed in Japanese Unexamined Patent Publication 2002-323706 (Patent Document 5).

FIG. 32 shows a pixel layout of the IPS mode disclosed in Patent Document 5. In each pixel, a pixel electrode 70 and a common electrode 71 arranged in a comb-like form, a TFT 64, a data line 62, a gate line 63, a storage capacitance line 67, and a common potential wiring 68 are provided. FIG. 33 is a sectional view taken along a line A-A' of FIG. 32. As can be seen from FIG. 33, on the TFT substrate 4, the common electrode 71 having a wider width than that of the data line 62 covers over the data line 62 via an interlayer film 46. By employing such structure, the electric field radiated from the data line 62 is shielded so as not to influence the electric field between the pixel electrode 70 and the common electrode 71. Therefore, the crosstalk can be suppressed greatly.

However, when the pixel layout (FIG. 30, FIG. 31) which reduces the moiré disclosed in Patent Document 2 and the pixel structure (FIG. 32, FIG. 33) of the IPS mode disclosed in Patent Document 5 are applied to the liquid crystal display device (FIG. 27, FIG. 28, FIG. 29) which displays three-dimensional videos disclosed in Patent Document 1, there is generated such a new issue that the numerical aperture is deteriorated greatly. The reason thereof will be described in a simple manner.

The technique for reducing the moiré disclosed in Patent Document 2 (FIG. 30) is a technique with which, provided that the light-shielding section that does not radiate the light located between the sub-pixels neighboring to each other in the X-axis direction is disposed obliquely with respect to the axis (Y-axis) of the cylindrical lens and that the length of the light-shielding section in the Y-axis direction is d, the length in the Y-axis direction of the aperture section at a place (side Et') where the light-shielding section is not disposed at the position of the aperture section in the X-axis direction is reduced for the length of d. This d is determined according to the space e between the sub-pixels neighboring to each other in the X-axis direction and the tilt θ between the light-shielding section and the X-axis, and it is necessary to reduce the values of e and θ in order to reduce the value of d.

When the pixel structure (FIG. 32 and FIG. 33) disclosed in Patent Document 5 is applied for the purpose of widening the viewing angles of the liquid crystal display device, it is necessary to cover the data line with the common electrode that has the wider width than that of the data line in order to shield the electric field from the data line located at the position of e. The liquid crystal molecules are controlled with the electric field between the common electrode and the pixel electrode in the IPS mode, so that an electric field constituted with a component in parallel to the substrate surface is hardly generated on the common electrode. Thus, the liquid crystal molecules hardly move. This means that the common electrode functions as the light-shielding section and that the length corresponding to d becomes long. In the meantime, when θ is set to be small, the length of the part where the aperture sections of the neighboring sub-pixels overlap with each other in the X-axis direction becomes long. The light emitted from the overlapping region reaches the eyes of the observer by being mixed with the light emitted from the neighboring sub-pixels, so that the observer simultaneously views the image for the left eye and the image for the right eye with one of the eyes. This may sometimes be called 3D crosstalk, and it becomes difficult for the observer to visually recognize an image as a three-dimensional video when the mixing ratio of the light becomes high. That is, θ cannot be set small for securing the numerical aperture, so that the numerical aperture is deteriorated greatly.

Therefore, it is investigated to make θ small by applying the technique shown in FIG. 31, which is disclosed in Patent Document 2. With the IPS mode, the director direction of the liquid crystal molecules is controlled with the electric field that is in parallel to the substrate surface generated between the pixel electrode and the common electrode arranged in a comb-like form to display videos. Thus, the liquid crystal molecules on the pixel electrode and the common electrode hardly move. Therefore, even when the pixel electrode and the common electrode are formed with a transparent conductive film such as ITO (Indium Tin Oxide) or the like, the pixel electrode and the common electrode turn out as the light-shielding sections that do not transmit the light. That is, there are a great number of light-shielding sections formed with the pixel electrode and the common electrode in the sub-pixels SP1 and SP2 shown in FIG. 31, so that the condition for suppressing the moiré is not satisfied. Therefore, while the deterioration in the numerical aperture can be reduced, the moiré cannot be suppressed.

As described above, when the structure (FIG. 32 and FIG. 33) of patent Document 5 with which the width e of the light-shielding section between the neighboring sub-pixels becomes large is employed, either the numerical aperture is deteriorated greatly or generation of the moiré cannot be suppressed.

It is therefore an exemplary object of the present invention to provide a liquid crystal display device having a wide viewing angle property capable of displaying three-dimensional videos, with which: generation of the moiré can be suppressed; only little crosstalk is generated; and a high numerical aperture can be achieved.

SUMMARY OF THE INVENTION

The liquid crystal display device according to an exemplary aspect of the invention is a liquid crystal display device which includes: a first substrate; a second substrate; and a liquid crystal layer sandwiched between the first substrate and the second substrate, liquid crystal molecules thereof being controlled by an electric field that is almost in parallel to those substrates, and the liquid crystal display device is characterized to include: sub-pixels disposed in an array form in a first direction and a second direction orthogonal to each other; an optical element which distributes light in the second direction; a gate line disposed by being extended to the second direction; and a data line disposed to divide the sub-pixel obliquely at a position different from a boundary between the sub-pixels neighboring to each other in the second direction.

BRIEF DESCRIPTION OF THE DRAWINGS

FIG. 21 is an illustration for describing the manufacture process of a liquid crystal display device of Example 1, which is a plan view showing the point where deposition of a gate insulating film is completed;

FIG. 22 is an illustration for describing the manufacture process of the liquid crystal display device of Example 1, which is a plan view showing the point where creation of a first contact is completed;

DETAILED DESCRIPTION OF THE PREFERRED EMBODIMENTS

A liquid crystal display device according to exemplary embodiments of the present invention will be described by referring to the accompanying drawings. Note that sizes and reduced scales of each structural element in each drawing are changed as appropriate in order to secure the visibility of the drawings. Further, hatching in each of the drawings is applied for discriminating each of the structural elements, and it does not mean a sectioned surface or the like. In the current Specification, same reference codes are used for same structural elements even when shapes and structures thereof are slightly different for making it easy to comprehend. In each of the exemplary embodiments, an example of "a first substrate" in the scope of the appended claims is a TFT substrate, an example of "a second substrate" is a CF (Color Filter) substrate, an example of "an optical element" is a lens array sheet, an example of "a first direction" is the Y-axis direction, an example of "a second direction" is the X-axis direction, an example of "a first electrode" is a pixel electrode, an example of "a second electrode and a third electrode" is a common electrode, an example of "a first angle" is an angle $\alpha$, and an example of "a second angle" is an angle $\beta$.

First Exemplary Embodiment

The liquid crystal display device according to the first exemplary embodiment is capable of displaying an image for the left eye and an image for the right eye, and it is capable of allowing an observer to visually recognize a three-dimensional video by displaying images different from each other to the left and right eyes of the observer.

Figure 1:
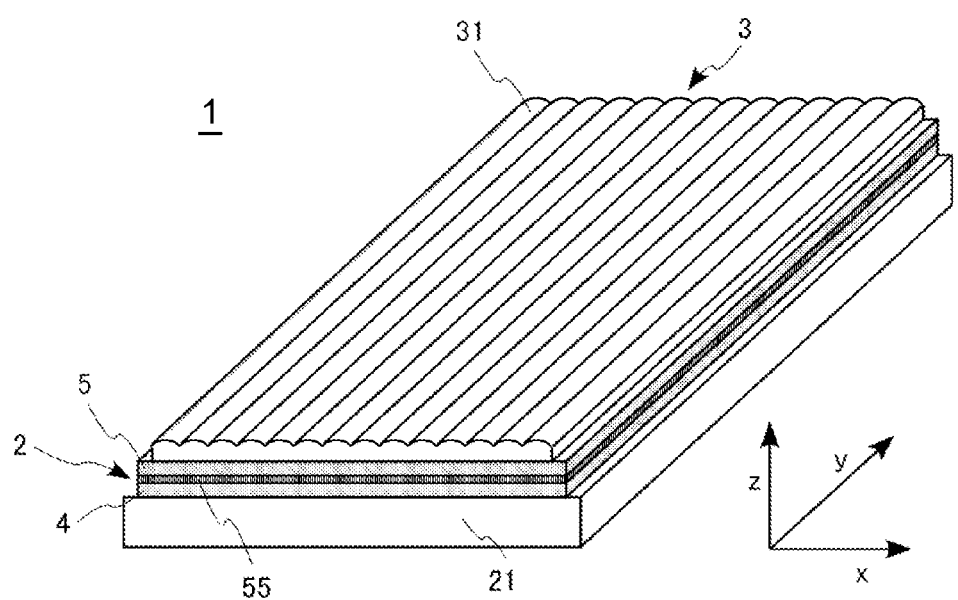
FIG. 1 is a solid view showing the structure of a liquid crystal display device according to a first exemplary embodiment.

As shown in FIG. 1, the liquid crystal display device 1 of the first exemplary embodiment is formed by disposing, on a liquid crystal panel 2, a lens array sheet 3 in which cylindrical lenses 31 are formed in an array form. Further, a backlight 21 is disposed on a surface that is in a reverse side of the lens surface of the liquid crystal panel 2.

Each of the cylindrical lenses 31 constituting the lens array sheet 3 is extended in the Y-axis direction and disposed in an array form along the X-axis direction. The cylindrical lens 31 does not exhibit the lens effect in the Y-axis direction (extending direction of the lens) but exhibits the lens effect only in the X-axis direction. That is, the cylindrical lens 31 operates as an optical element which distributes the light emitted from each pixel disposed on the liquid crystal panel 2 towards the X-axis direction.

The liquid crystal panel 2 is a structure in which a liquid crystal layer 55 is sandwiched between a TFT substrate 4 and a CF substrate 5, and an optical film (not shown) such as a polarization plate is disposed on the surface that is a reverse side of the surfaces of the TFT substrate 4 and the CF substrate 5 in contact with the liquid crystal layer 55. Alignment processing is executed on liquid crystal molecules in the liquid crystal layer 55 so that the director direction thereof becomes almost in parallel to the surfaces of the TFT substrate 4 and the CF substrate 5.

Further, sub-pixels 61 (FIG. 2) for displaying the image for the right eye and the image for the left eye are arranged in matrix in the X-axis direction and the Y-axis direction on the liquid crystal panel 2. The focal point of the cylindrical lens 31 is set to be in the vicinity of the interface between the CF substrate 5 and the liquid crystal layer 55.

Figure 2:
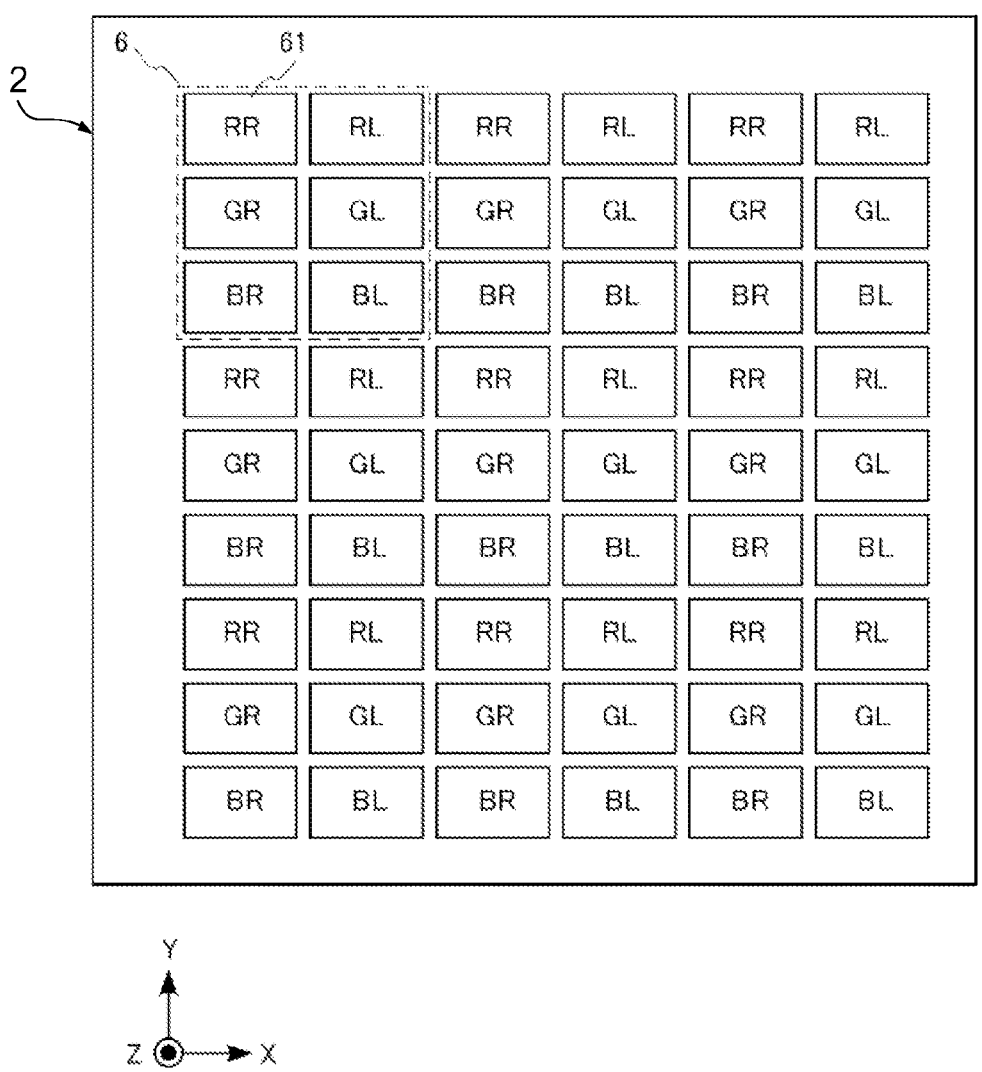
FIG. 2 is an illustration schematically showing a pixel layout of the liquid crystal display device according to the first exemplary embodiment.

FIG. 2 is a chart schematically showing the pixel layout of the liquid crystal panel 2. The liquid crystal panel 2 has 3×3 pixels 6 in the X-axis direction and the Y-axis direction, and each pixel 6 is constituted with six sub-pixels 61 arranged in a matrix form. The six sub-pixels constituting a single pixel 6 are arranged as sub-pixels RR, RL, GR, GL, BR, and BL. The sub-pixel RR displays a red image for the right eye, the sub-pixel RL shows a red image for the left eye. Similarly, each of the sub-pixels GR, GL, BR, and BL shows a green image for the right eye, a green image for the left eye, a blue image for the right eye, and a blue image for the left eye, respectively. As can be seen from the drawing, a row of the sub-pixels 61 arranged in the Y-axis direction displays images of a same color, and rows of sub-pixels displaying each of the colors R, G, and B are arranged in order in the Y-axis direction.

Figure 3:
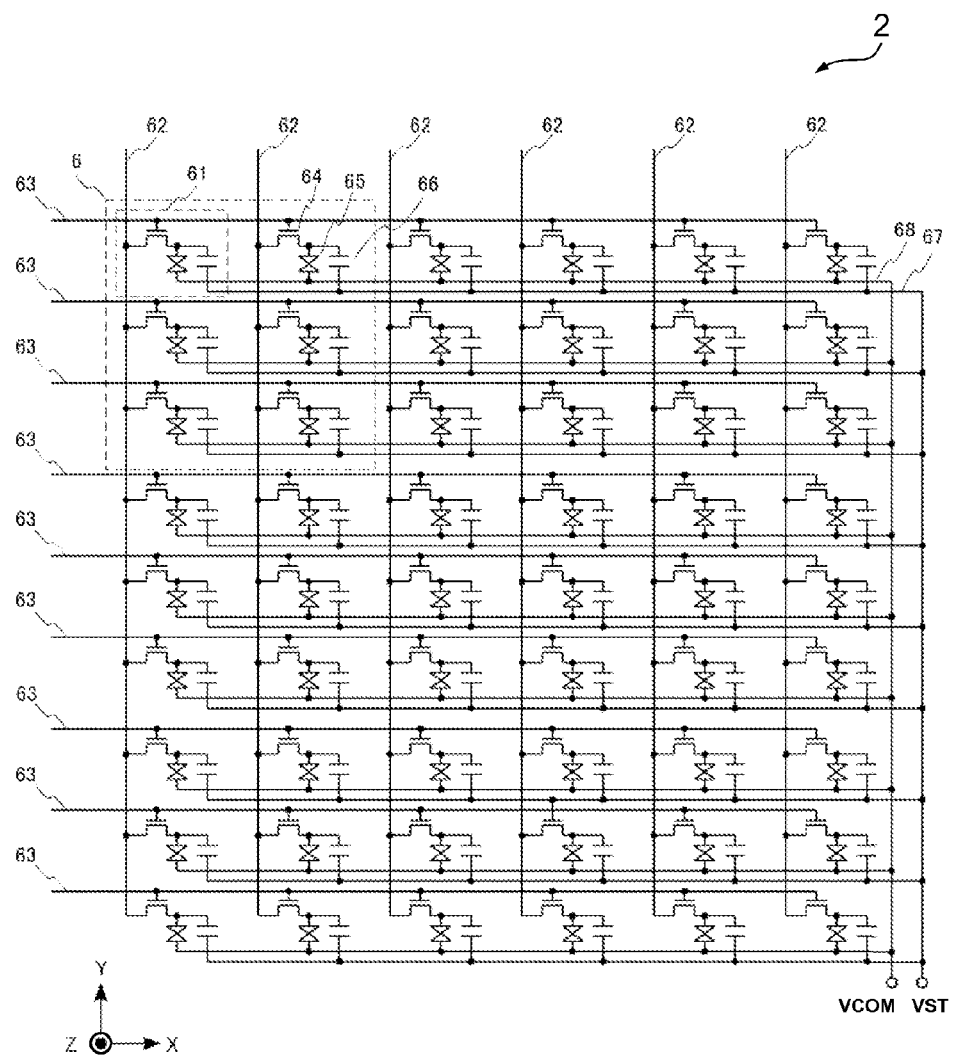
FIG. 3 is a circuit diagram showing the structure of the liquid crystal display device according to the first exemplary embodiment.

FIG. 3 is a chart showing the circuit structure of the liquid crystal panel 2. Each of the sub-pixels 61 is constituted with at least a TFT 64, a liquid crystal capacitance 65, and a storage capacitance 66. In a row of the sub-pixels 61 arranged in the X-axis direction, a single gate line 63 is disposed, and the terminals of gates 47 (FIG. 22) of the TFTs 64 of all the sub-pixels 61 of the same row are connected to the same gate line 63. In a column of the sub-pixels 61 arranged in the Y-axis direction, a single data line 62 is disposed, and terminals of sources 49 (FIG. 22) of the TFTs 64 of all the sub-pixels 61 of the same column are connected to the same data line 62. The liquid crystal capacitance 65 is constituted with a pixel electrode and a common electrode. The pixel electrode is connected to the terminal of a drain 48 (FIG. 22) of the TFT 64, and the common electrode is connected to a common potential wiring 68. Out of the two electrodes constituting the storage capacitance 66, one of the electrodes is connected to the drain terminal of the TFT 64, and the other electrode is connected to a storage capacitance line 67.

Figure 4:
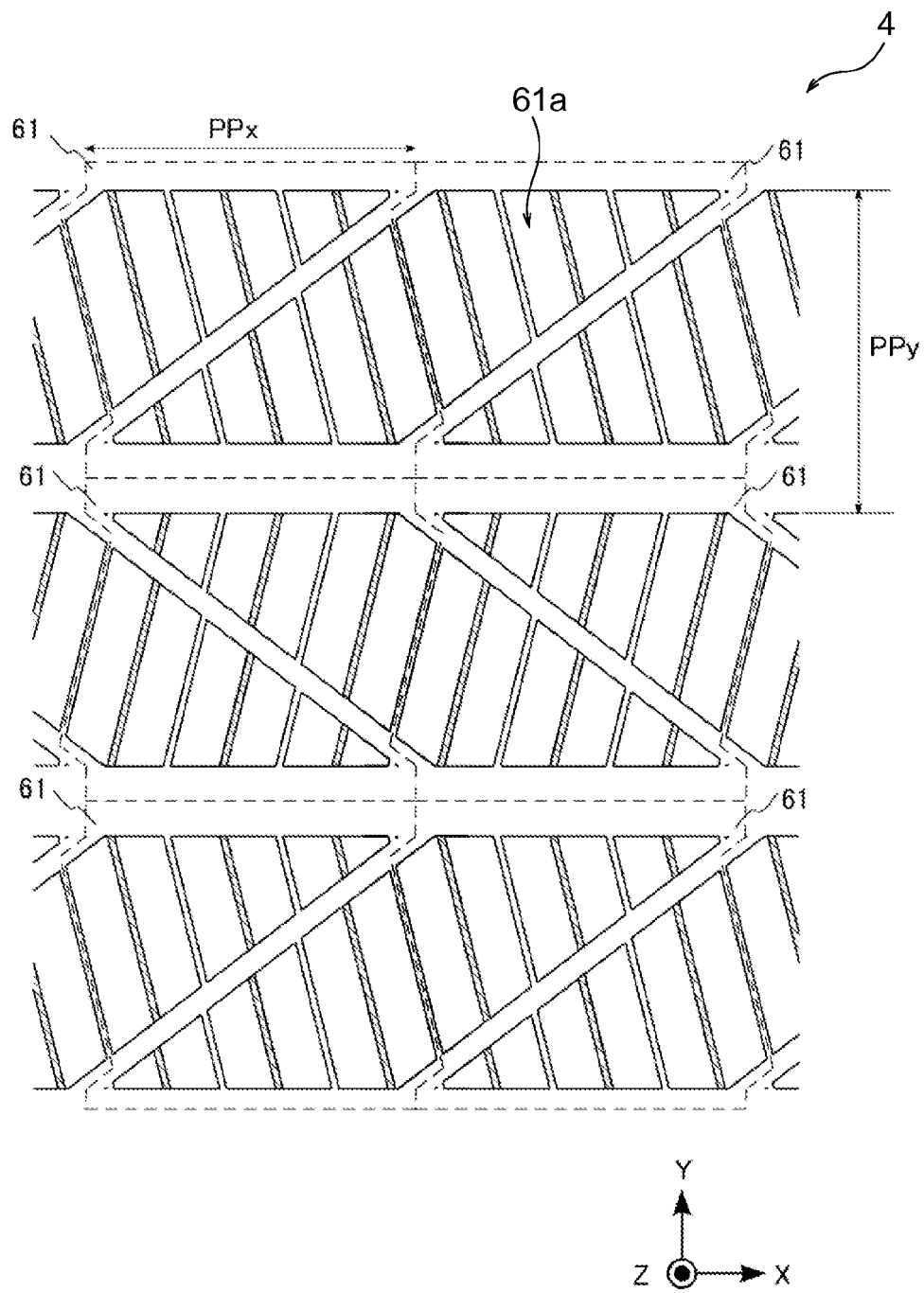
FIG. 4 is a plan view showing the pixel layout on a TFT substrate of the liquid crystal display device according to the first exemplary embodiment.
Figure 5:
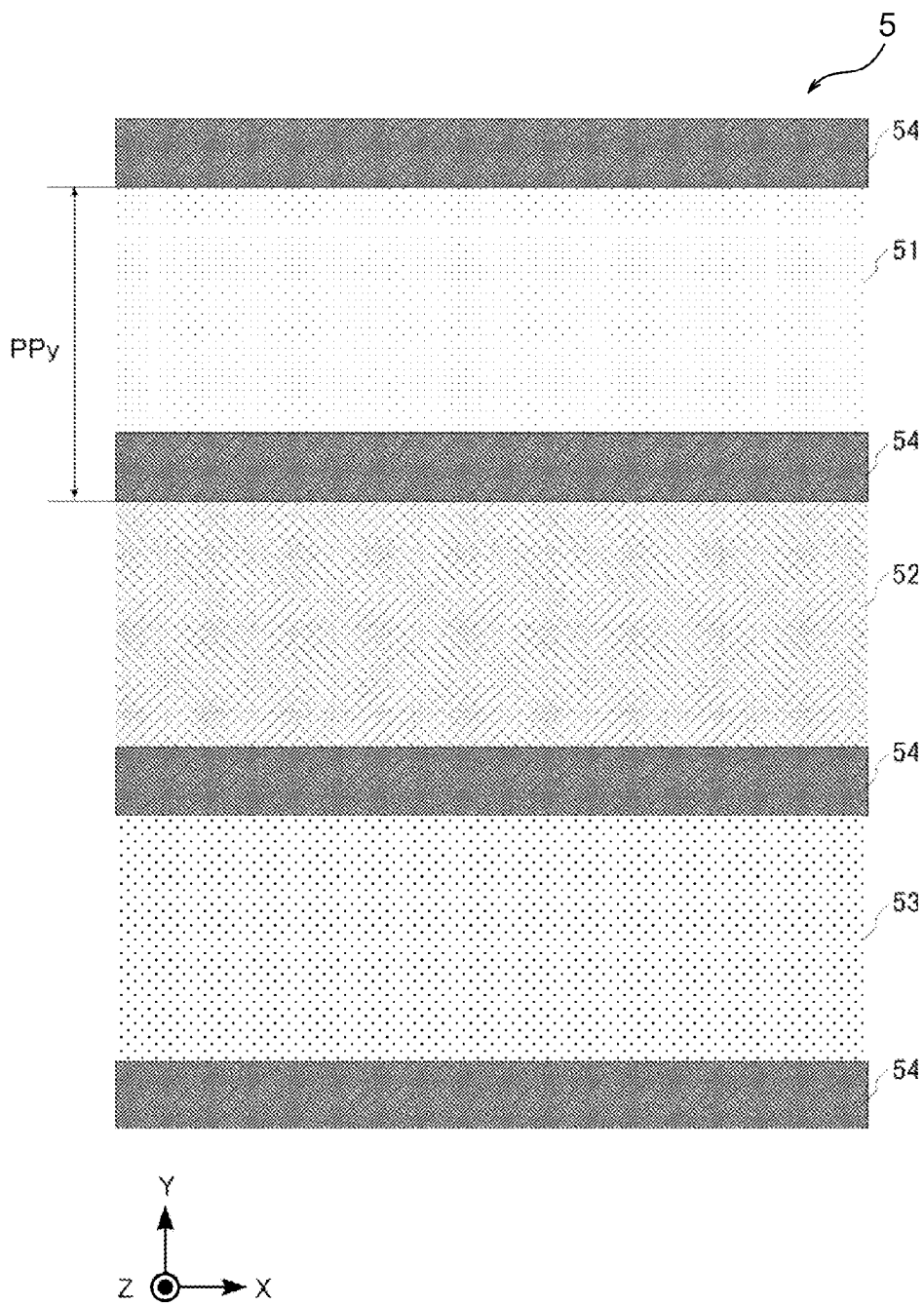
FIG. 5 is a plan view showing the pixel layout on a CF substrate of the liquid crystal display device according to the first exemplary embodiment.

FIG. 4 is the pixel layout on the TFT substrate 4, which shows the structure that defines an aperture section 61*a* where light is transmitted. This illustration shows a case where 2×3 sub-pixels 61 are arranged in the X-axis direction and the Y-axis direction. The sub-pixels 61 are disposed at a pitch of PPx in the X-axis direction and at a pitch of PPy in the Y-axis direction. FIG. 5 shows the layout of the CF substrate 5 corresponding to the sub-pixels 61 shown in FIG. 4. On the CF substrate 5, a BM (Black Matrix) 54 for shielding the light, an R resist 51, a G resist 52, and a B resist 53 for transmitting the light of the wavelengths corresponding to three primary colors of light are disposed. The BM 54 has a long-and-thin striped shape in the X-axis direction, and the R resist 51, the G resist 52, and the B resist 53 are disposed between the BM 54. Needless to mention, the order of the color resists is set to correspond to the pixel layout shown in FIG. 2.

Figure 6:
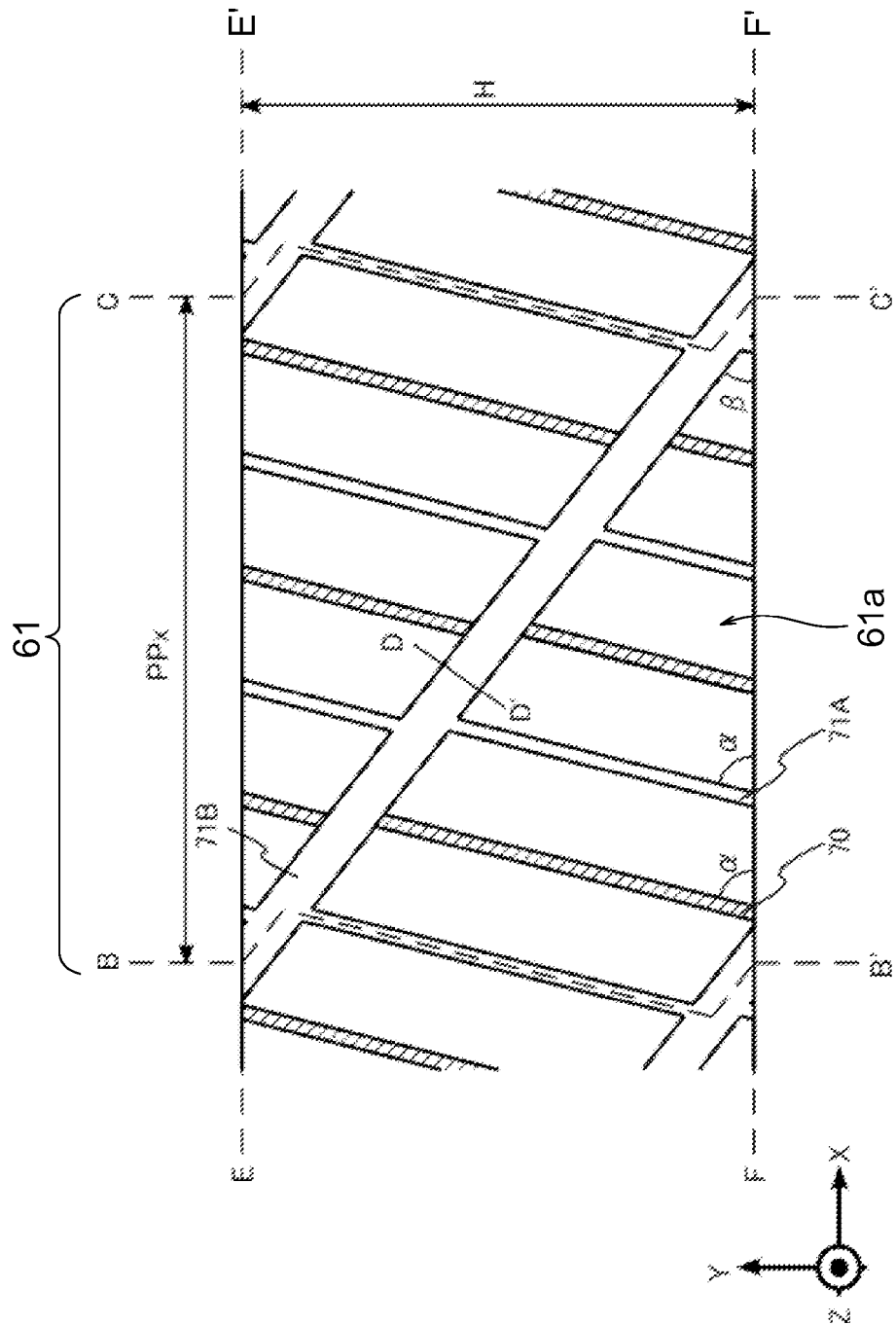
FIG. 6 is a plan view showing the layout of an aperture section of a sub-pixel of the liquid crystal display device according to the first exemplary embodiment.
Figure 7:
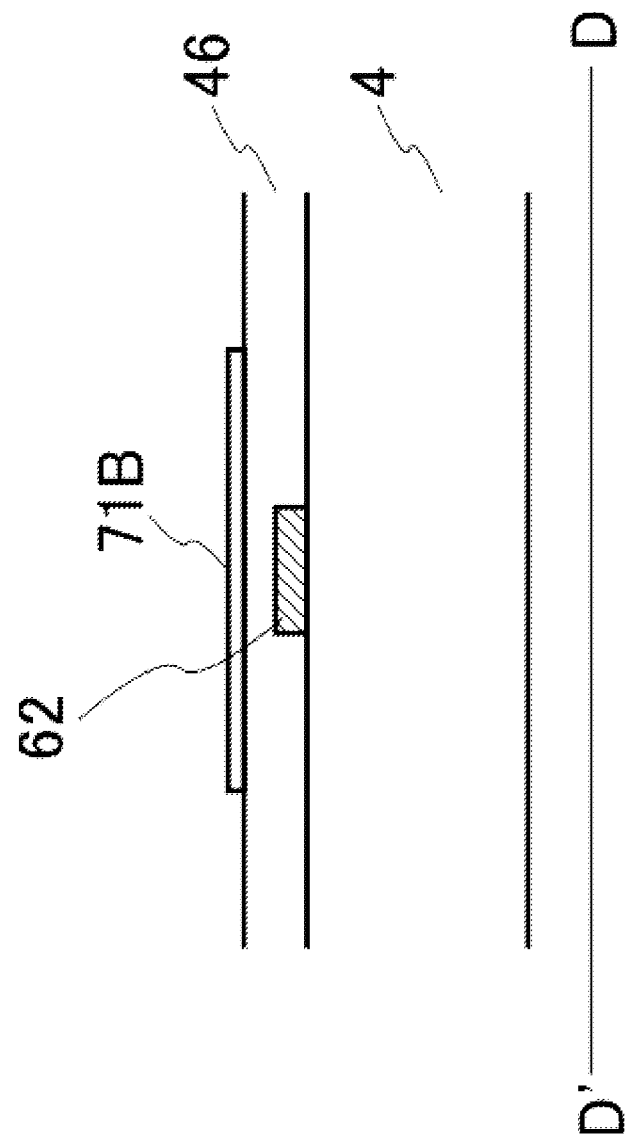
FIG. 7 is a sectional view of the TFT substrate of the liquid crystal display device according to the first exemplary embodiment.

FIG. 6 shows the layout of the aperture section 61*a* of a single sub-pixel 61 when the TFT substrate 4 shown in FIG. 4 and the CF substrate 5 shown in FIG. 5 are superimposed. The height H of the aperture section 61*a* in the Y-axis direction is defined by a dotted line E-E' and a dotted line F-F' in parallel to the Y-axis, and it can be defined with the BM 54 (FIG. 5) of the CF substrate 5. A dotted line B-B' and a dotted line C-C' show the boundary between the two sub-pixels 61 which are neighboring to each other in the X-axis direction. In the aperture section 61*a* sectioned with the dotted line E-E', the dotted line F-F', the dotted line B-B', and the dotted line C-C', common electrodes and pixel electrodes are disposed. The common electrode is constituted with: a common electrode 71B tilted with respect to the X-axis at an angle of β, which is the part obliquely dividing the aperture section 61*a*; and a common electrode 71A tilted with respect to the X-axis at an angle of α, which is the part obliquely dividing the aperture section 61*a*. The pixel electrode 70 is tilted with respect to the X-axis at an angle of α, which is disposed to divide the aperture section 61*a* alternately with the common electrode 71A. FIG. 7 shows a sectional view of the TFT substrate 4 taken along a virtual line D-D' shown in FIG. 6, in which the data line 62 is disposed in such a manner to be covered by the common electrode 71B via the interlayer film 46. Note that the TFT 64, the storage capacitance 66, and the gate line 63 constituting the sub-pixel 61 shown in FIG. 3 are disposed in a region other than the aperture section 61*a* shown in FIG. 6.

Next, the layout of the common electrodes 71A, 71B, and the pixel electrode 70 in the aperture section 61*a* of the sub-pixel 61 will be described in details by referring to FIG. 8.

The common electrode 71B has the width of Ws, and divides the aperture section 61*a* obliquely. It is so defined in this case that the intersection point between the center line of the common electrode 71B and the dotted line E-E' comes on the line of the dotted line B-B', and the intersection point between the center line and the dotted line F-F' comes on the line of the dotted line C-C'. With that, the length of the aperture section 61*a* of the common electrode 71B projected on the X-axis becomes the pitch PPx of the sub-pixels 61 in the X-axis direction. Thus, a following expression applies.

$$\tan\beta = H/PPx \qquad (2)$$

The common electrode 71A and the pixel electrode 70 have the widths We equal to each other, which are disposed alternately in the X-axis direction in the aperture section 61*a* of the sub-pixel 61 at an equivalent pitch Pe. Provided that the number into which the aperture section 61*a* is divided by the common electrode 71A and the pixel electrode 70 is n, n is set to be an even number. In the case of FIG. 8, n=6. Further, when the common electrode 71A is disposed at a position between the boundary of the two neighboring sub-pixels 61*a*, e.g., at a position on the dotted line B-B', the common electrode 71A is disposed also at a position on the dotted line C-C' that is the other boundary.

Figure 9:
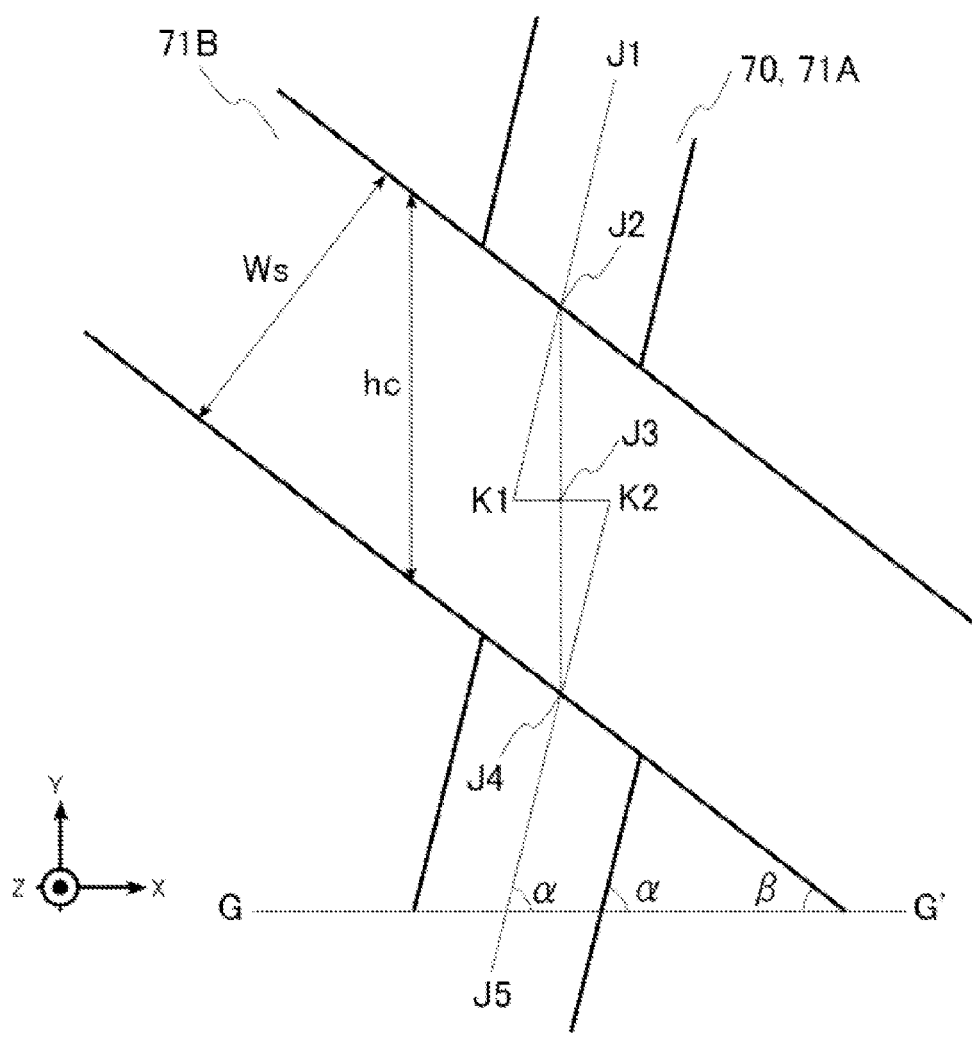
FIG. 9 is a fragmentary enlarged plan view showing the layout of the aperture section of the sub-pixel of the liquid crystal display device according to the first exemplary embodiment.

FIG. 9 is an enlarged view of the intersection part of the common electrode 71B disposed by being tilted with respect to the X-axis at an angle of β and the pixel electrode 70 or the common electrode 71A disposed by being tilted with respect to the X-axis at an angle of α, and a line G-G' is an auxiliary line in parallel to the X-axis. J1, J2, J3, J4, and J5 in FIG. 9 show the center lines of the pixel electrode 70 or the common electrode 71A. J2 shows the intersection point between the center line and one side of the common electrode 71B, and J4 shows the intersection point between the center line and the other side of the common electrode 71B. Note here that the positions of J2 and J4 in the X-axis direction are designed to be equivalent as the layout of the pixel electrode 70 and the common electrode 71A. With that, a segment J2-J4 becomes in parallel to the Y-axis. A segment J2-K1 is an extended line of a segment J1-J2, and a segment J4-K2 is an extended line of a segment J5-J4. Further, by having J3 as the center of the segment J2-J4, the position of K2 in the Y-axis direction is set to be equivalent to that of J3. Provided that the width of the common electrode 71B is Ws, length hc cut along a line in parallel to the Y-axis can be expressed as follows.

$$hc = Ws/\cos\beta \qquad (3)$$

Further, when the intersection parts are set as in the manner described above, a triangle J2J3K1 and a triangle J4J3K2 are congruent triangles. Thus, the length dc of the segment K1-K2 can be written as follows based on the geometric relation.

$$dc = Ws/(\cos\beta \times \tan\alpha) \qquad (4)$$

Figure 8:
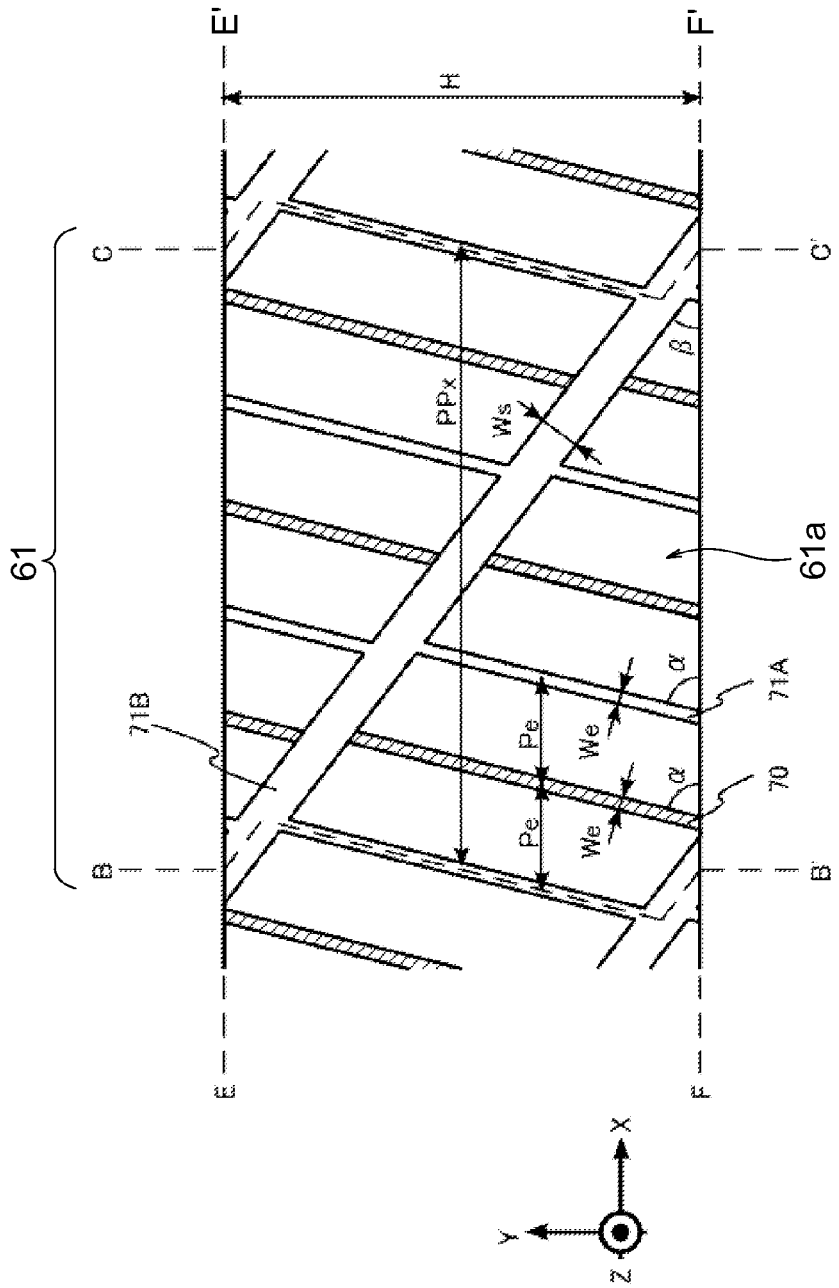
FIG. 8 is a plan view showing the layout of an aperture section of a sub-pixel of the liquid crystal display device according to the first exemplary embodiment.

Further, provided that the pitch of the common electrode 71A and the pixel electrode 70 is Pe as shown in FIG. 8, Pe is set to satisfy the following relational expression.

$$Pe = (PPx + dc)/n \qquad (5)$$

Further, the relations regarding the angle α and H, PPx, dc are set to satisfy a following expression.

$$\tan \alpha = n \times (H-hc)/(m \times (PPx+dc)) \quad (6)$$

Note here that m is a natural number, and m=1 in the case of the example shown in FIG. 8. Expression (4) is substituted to dc in Expression (6). Then, α can be acquired by solving the equation.

Next, the actions will be described. In order to display an image on the display panel 2, it is necessary to write a video signal voltage according to the image to each sub-pixel 61. In FIG. 3, a voltage with which the TFT 64 comes in a conductive state is applied to a given gate line 63. At this time, through applying the voltage of the video signal corresponding to one row of the sub-pixels 61 to all the data lines 62, the voltage of the video signal is written to the liquid crystal capacitance 65 and the storage capacitance 66 via the TFT 64. After completing the writing of the video signal, the voltage of the gate line 63 is set to a voltage with which the TFT 64 becomes nonconductive. Thereby, the voltage of the video signal written to the liquid crystal capacitance 65 and the storage capacitance 66 is maintained. Through executing this action for all the data lines 63, video signals for one screen can be written. Note that a constant voltage VCOM is applied to the common potential wiring 68, and a constant voltage VST is applied to the storage capacitance line 67.

With the above-described action, an electric field is generated in the liquid crystal capacitance 65 of each sub-pixel 61 according to the video signal voltage held at the pixel electrode and the voltage VCOM applied to the common electrode. The electric force line of this electric field connects the pixel electrode 70 and the common electrode 71A shown in FIG. 6 with the minimum distance. In a case where a material exhibiting positive permittivity anisotropy is used as the liquid crystal material of the liquid crystal layer 55 shown in FIG. 1, the directors of the liquid crystal molecules receive a torque to become in parallel to the electric force line so that the alignment thereof is changed. The intensity of the transmitting light changes due to the change in the alignment, so that it is possible to display the image. In this alignment change, the alignment is changed in such a manner that the direction of the directors of the liquid crystal molecules is rotated on a same plane while being in parallel to the surface of the TFT substrate 4. With the liquid crystal display device according to the first exemplary embodiment, it is possible to achieve a wide viewing angle property and to acquire an image quality with less crosstalk. Further, it is possible to achieve the effect of having no moiré, low 3D crosstalk, and low deterioration in the numerical aperture.

First, the reason for achieving the wide viewing angle property and for generating no crosstalk will be described. The liquid crystal display device of the first exemplary embodiment uses the IPS mode which controls the alignment state of the liquid crystal molecules with an electric field in parallel to the plane of the TFT substrate 4, which is generated between the pixel electrode 70 and the common electrode 71A disposed on the TFT substrate 4. With the IPS mode, the directors of the liquid crystal molecules have almost no component in the normal direction of the TFT substrate 4. Thus, there is almost no change in the contrast when the observer observes from any angles with respect the normal line. Therefore, it is possible to achieve the wide viewing angle property.

Further, the cause for generating crosstalk with the IPS mode is the electric field leaked mainly from the data line 62, which influences the intensity of the electric field generated between the pixel electrode 70 and the common electrode 71A. With the liquid crystal display device according to the first exemplary embodiment, the data line 62 is covered by the common electrode 71B having a sufficient width, so that the electric field leaked mainly from the data line 62 has almost no influence upon the intensity of the electric field generated between the pixel electrode 70 and the common electrode 71A. Therefore, crosstalk is not generated.

Next, the reason for having no moiré and for making it possible to acquire a high numerical aperture will be described. As has been already described, moiré is visually recognized when the lengths of the aperture sections 61*a* of the pixels in the Y-axis direction are different at the positions in the alignment direction (X-axis direction) of the cylindrical lenses 31. Thus, when the sum of the lengths of the aperture sections 61*a* of the pixels in the Y-axis direction is constant regardless of the positions in the X-axis direction, moiré is not generated. In a case of the IPS mode, there is almost no electric field generated in parallel to the plane of the TFT substrate 4 on the common electrodes 71A, 71B and the pixel electrode 70 even when transparent electrodes are used for those electrodes. Thus, those electrode parts can be considered as the light-shielding sections which do not transmit the light.

The sum of the lengths in the Y-axis direction of the aperture sections 61*a* of the liquid crystal display device according to the first exemplary embodiment will be described. As can be seen from FIG. 8, the aperture section 61*a* is defined by the dotted line E-E' as well as the dotted line F-F' in parallel to the Y-axis, the common electrode 71B, the common electrode 71A, and the pixel electrode 70. The sum of the lengths of the aperture section 61*a* in the Y-axis direction can be acquired by subtracting the sum of the parts where the light is not transmitted from the height H that defines the aperture section 61*a*. Therefore, the length of the part where the light is not transmitted will be described by separating it to the part generated due to the common electrode 71B and the part generated due to the common electrode 71A and the pixel electrode 70.

Figure 10:
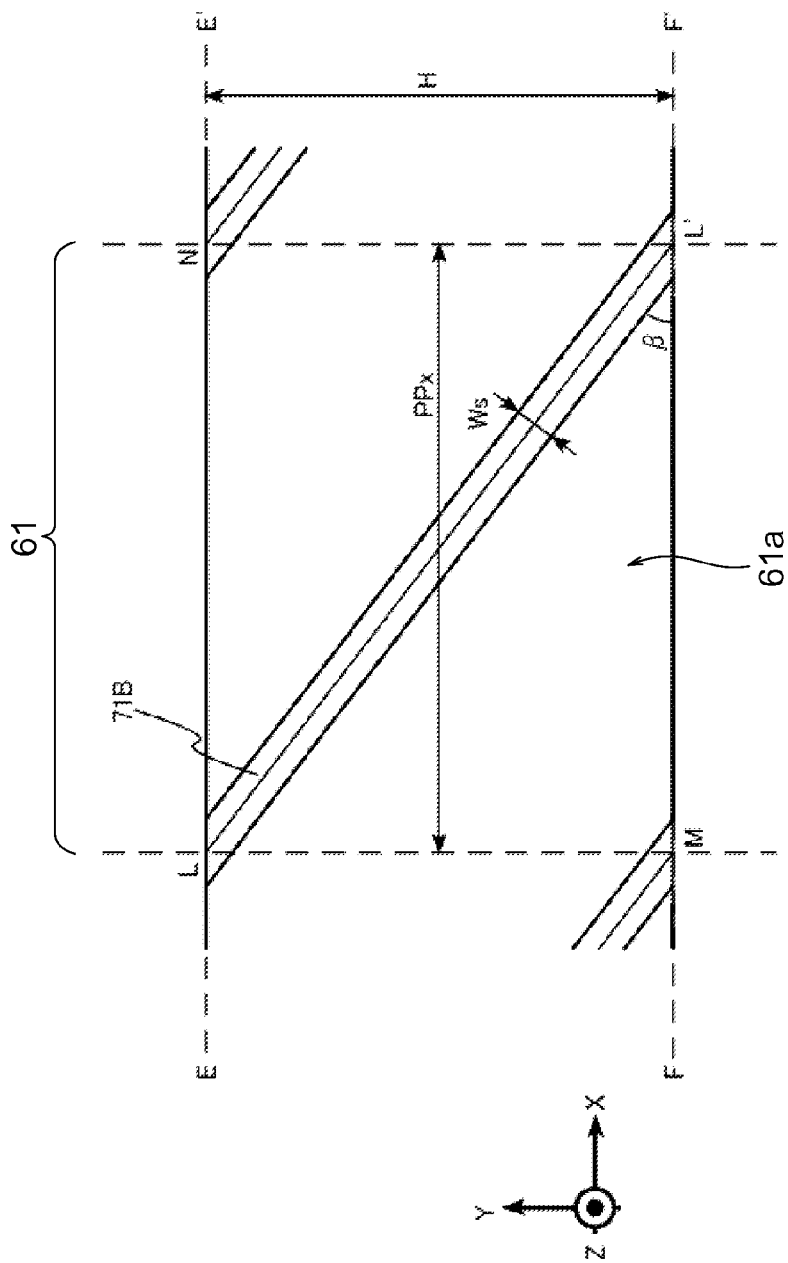
FIG. 10 is a plan view showing only a part of common electrodes in the layout of the aperture section of the sub-pixel of the liquid crystal display device according to the first exemplary embodiment.

FIG. 10 is a layout in which the common electrode 71A and the pixel electrode 70 in FIG. 8 are omitted. In the drawing, L and L' show the points where the center line of the common electrode 71B intersects with the dotted line E-E' and with the dotted line F-F'. In the liquid crystal display device of the first exemplary embodiment, the length projected to the X-axis of the common electrode 71B in the aperture section 61*a* is set to be equivalent to the pitch PPx of the sub-pixel 61 in the X-axis direction. Thus, provided that the points where the common electrode 71B of the two sub-pixels 61 neighboring to each other in the X-axis direction intersects with the dotted line E-E' and with the dotted line F-F' are M and N, respectively, the positions of the point L and the point M in the X-axis direction are equivalent and the positions of the point L' and the point N in the X-axis direction are equivalent as well. Therefore, the length in the Y-axis direction where the aperture section 61*a* is light-shielded by the common electrode 71B becomes hc (FIG. 9) regardless of the positions in the X-axis direction based on the geometric relation.

Figure 11:
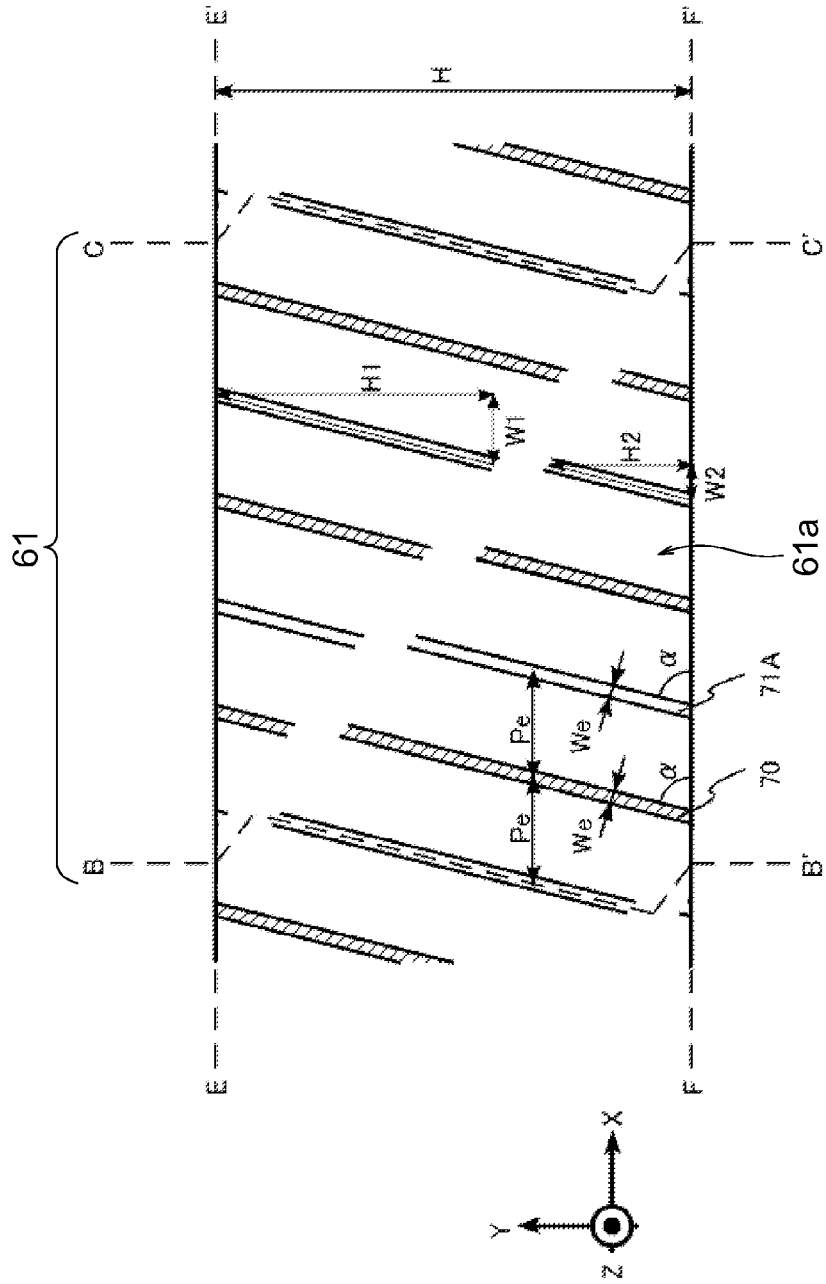
FIG. 11 is a plan view showing only a part of common electrodes and a part of pixel electrodes in the layout of the aperture section of the sub-pixel of the liquid crystal display device according to the first exemplary embodiment.

FIG. 11 is a layout in which the common electrode 71B part in FIG. 8 is omitted. Now, the component of the length in the X-axis direction and the component of the length in the Y-axis direction of an arbitrary common electrode 71A or an arbitrary pixel electrode 70 in a sub-pixel will be investigated. As shown in FIG. 10, the common electrode 71B is disposed obliquely at a sub-pixel pitch in the X-axis direction. Thus, an arbitrary common electrode 71A and an arbitrary pixel electrode 70 are necessarily shorter than H by the amount of the width hc (FIG. 9) of the common electrode 71B in the Y-axis direction. Therefore, provided that the length components in the Y-axis direction of the common electrode 71A or the pixel electrode 70 are H1 or H2 as shown in FIG. 11, a following relational expression applies.

$$H1+H2=H-hc \quad (7)$$

Thus, the length components W1 and W2 of the common electrode 71A or the pixel electrode 70 in the X-axis direction can be written as follows.

$$W1 + W2 = (H1 + H2)/\tan\alpha \quad (8)$$
$$= (H - hc)/\tan\alpha$$

Since $\alpha$ is so set that the relation of Expression (6) applies, Expression (8) can be rewritten as follows.

$$W1+W2=m\times(PPx+dc)/n \quad (9)$$

This is the value that is m times of the pitch of the common electrode 71A and the pixel electrode 70 in the X-axis direction. This means that the point in the X-axis direction at which an arbitrary common electrode 71A or an arbitrary pixel electrode 70 intersects with the dotted line E-E' matches the point in the X-axis direction at which the neighboring m-th electrode therefrom intersects with the dotted line F-F'. That is, m-pieces of the common electrodes 71A or the pixel electrodes 70 are disposed in the pitch Pe. Since all of the widths of the common electrodes 71A and the pixel electrodes 70 are equivalent and the intersection points with the common electrode 71B are in the relation shown in FIG. 9, the length of the aperture section 61a in the Y-axis direction light-shielded by the common electrode 71A and the pixel electrode 70 becomes as follows regardless of the positions in the X-axis direction.

$$m\times We/\cos\alpha \quad (10)$$

Therefore, the length of the aperture section 61a in the Y-axis direction light-shielded by the common electrode 71B, the common electrode 71A, and the pixel electrode 70 can be expressed as follows, and the value thereof is constant regardless of the positions in the X-axis direction.

$$hc+m\times We/\cos\alpha \quad (11)$$

The length of the aperture section 61a in the Y-axis direction of the pixel is the value acquired by subtracting Expression (11) from the aperture height H, so that it is constant regardless of the positions in the X-axis direction. Therefore, moiré is not generated.

Next, the reason why the deterioration in the numerical aperture is small will be described. In the liquid crystal display device according to the first exemplary embodiment, the data line 62 is not disposed between the sub-pixels 61 neighboring to each other in the X-axis direction but disposed to cross the sib-pixel 61 obliquely (FIG. 6 and FIG. 7). Thus, the angle $\beta$ between the data line 62 and the X-axis becomes small, so that the deterioration in the numerical aperture is small even when the width of the common electrode 71B functioning as a shield for covering over the data line 62 is widened sufficiently. As shown in FIG. 9, it is because the numerical aperture becomes greater when hc is smaller, and hc becomes smaller as $\beta$ becomes smaller. Further, in the liquid crystal display device according to the first exemplary embodiment, the boundary between the sub-pixels 61 neighboring to each other in the X-axis direction is defined with the angle $\alpha$ that is different from $\beta$. When $\alpha$ is small, the light radiated from the neighboring sub-pixels 61 is more mixed, so that 3D crosstalk is worsened. However, with the liquid crystal display device according to the first exemplary embodiment, large values can be set for $\alpha$ and $\beta$ individually. Therefore, it is possible to decrease the 3D crosstalk.

As an exemplary advantage according to the invention, it is possible to achieve a wide viewing angle property and the picture quality with less crosstalk. Furthermore, it is possible to achieve the picture quality with less deterioration in the numerical aperture with no generation of the moiré and low 3D crosstalk.

Second Exemplary Embodiment

Figure 12:
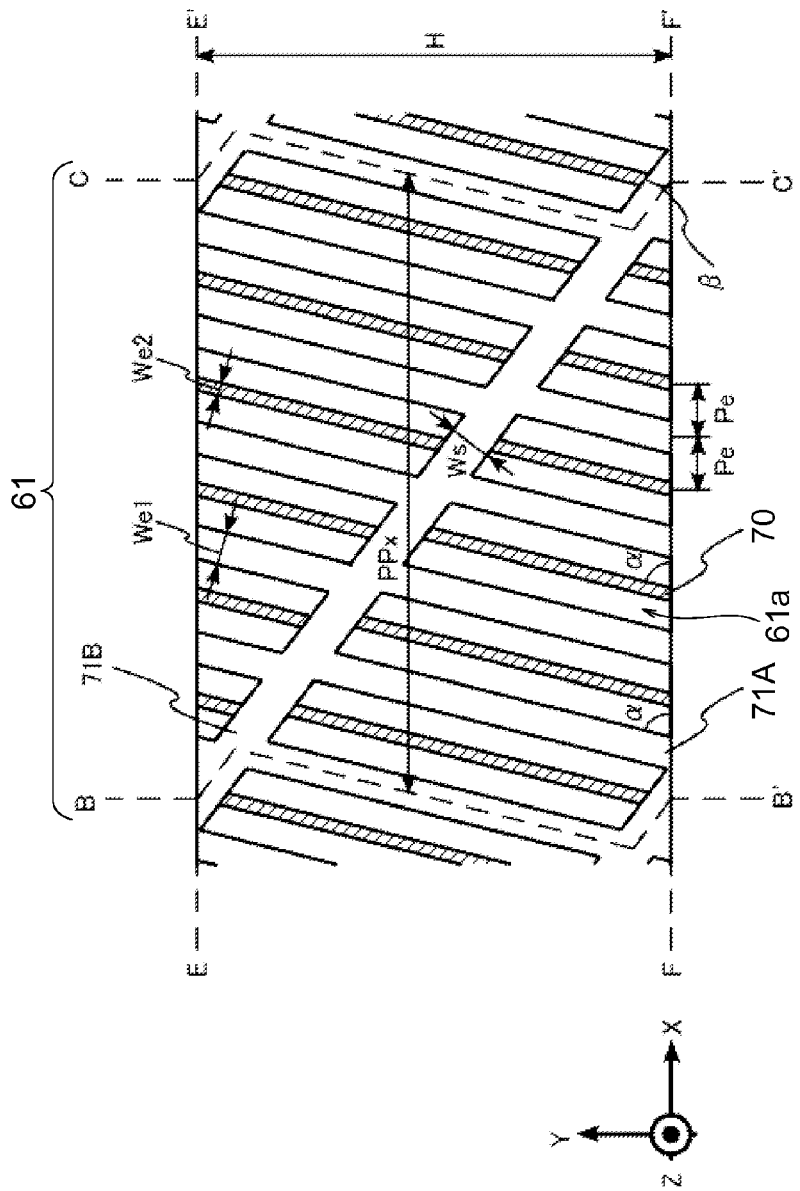
FIG. 12 is a plan view showing the layout of an aperture section of a sub-pixel of the liquid crystal display device according to a second exemplary embodiment.

A liquid crystal display device according to a second exemplary embodiment has almost the same structures as those of the liquid crystal display device according to the first exemplary embodiment, and the layout of the aperture section of the sub-pixel is different. Therefore, the pixel layout and the circuit structure of the second exemplary embodiment are the same as those of the first exemplary embodiment, and the CF substrate having the layout of FIG. 5 is also used herein. FIG. 12 shows the layout of the aperture section 61a of the sub-pixel 61 when the TFT substrate and the CF substrate are superimposed in the liquid crystal display device according to the second exemplary embodiment.

In the liquid crystal display device of the second exemplary embodiment, there is the aperture section 61a that is defined with a dotted line E-E' as well as a dotted line F-F' defining the height of the aperture section 61a of the sub-pixel 61 in the Y-axis direction, and a dotted line B-B' as well as a dotted line C-C' defining the boundary of the sub-pixels 61 neighboring to each other in the X-axis direction. The dotted line E-E' and the dotted line F-F' are in parallel to the X-axis direction, and those can be defined with the BM 54 of the CF substrate 5 (FIG. 5). The common electrode 71B tilted at $\beta$ with respect to the X-axis direction is disposed to divide the aperture section 61a obliquely, and the common electrode 71A and the pixel electrode 70 tilted at $\alpha$ with respect to the X-axis direction are disposed alternately at a pitch of Pe in the X-axis direction. Provided that the number into which the aperture section 61a is divided in the X-axis direction with the common electrode 71A and the pixel electrode 70 is n, n is an even number. In the case of FIG. 12, n=12. The difference with respect to the case of the liquid crystal display device of the first exemplary embodiment is that the width We1 of the common electrode 71A and the width We2 of the pixel electrode 70 are different. Further, although not shown, a data line is disposed under the common electrode 71B as in the case of the liquid crystal display device of the first exemplary embodiment.

In the liquid crystal display device according to the second exemplary embodiment, the layout of the common electrode 71B is designed to be the same as that of the first exemplary embodiment. Therefore, Expression (2) applies.

The layout of the part where the common electrode 71B, the common electrode 71A, and the pixel electrode 70 intersect with each other is as shown in FIG. 9, so that Expression (3) and Expression (4) apply as in the case of the liquid crystal display device of the first exemplary embodiment. Pitch Pe and the angle $\alpha$ are set to satisfy Expression (5) and Expression (6). Note here that m in Expression (6) is defined as an even number. In the case of FIG. 12, m is 2. The same method used in the liquid crystal display device of the first exemplary embodiment can be used for the driving method of the liquid crystal display device according to the second exemplary embodiment.

With the liquid crystal display device according to the second exemplary embodiment, it is possible to achieve a wide viewing angle property and to acquire an image quality with less crosstalk. Further, it is possible to achieve the effect of having no moiré, low 3D crosstalk, and low deterioration in the numerical aperture.

The reason that the liquid crystal display device according to the second exemplary embodiment can achieve a wide viewing angle property and acquire an image quality with less crosstalk is the same as the reason described in the case of the liquid crystal display device according to the first exemplary embodiment.

Next, the reason for having no moiré generated in the liquid crystal display device of the second exemplary embodiment will be described. The condition for not generating the moiré is that the length of the pixel aperture section in the Y-axis direction is equivalent regardless of the positions in the X-axis direction. Therefore, the length in the Y-axis direction of the pixel aperture section of the liquid crystal display device according to the second exemplary embodiment will be described. The length in the Y-axis direction of the light-shielding section light-shielded by the common electrode 71B disposed in the aperture section 61a of the sub-pixel 61 is hc as in the case of the liquid crystal display device of the first exemplary embodiment. This is evident since the layout of the common electrode 71B is designed to be the same as that of the liquid crystal display device of the first exemplary embodiment.

Figure 13:
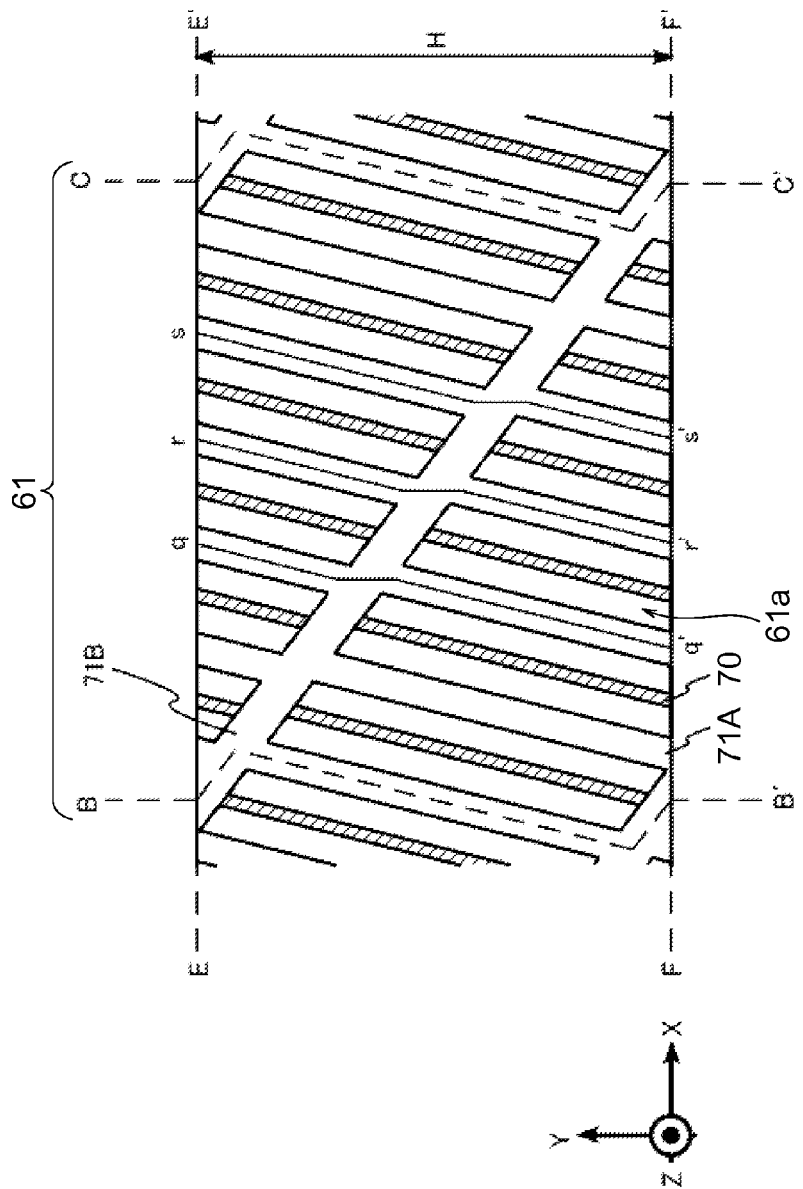
FIG. 13 is a plan view showing the layout of the aperture section of the sub-pixel of the liquid crystal display device according to the second exemplary embodiment.

Next, the length in the Y-axis direction of the light-shielding section light-shielded by the common electrode 71A and the pixel electrode 70 disposed in the aperture section 61a of the sub-pixel 61 will be described. As shown in FIG. 13, three center lines of the neighboring common electrodes 71A out of the common electrodes 71A disposed in the aperture sections 61a of the sub-pixel 61 are defined as q-q', r-r', and s-s'. In the second exemplary embodiment, m in Expression (6) is 2. Thus, the length component of the center line r-r' in the X-axis direction is twice as that of Pe (FIG. 12). Therefore, the position of the intersection point between the center line r-r' and the dotted line E-E' in the X-axis direction is equivalent to the position of the intersection point between the center line s-s' and the dotted line F-F' in the X-axis direction, and the position of the intersection point between the center line r-r' and the dotted line F-F' in the X-axis direction is equivalent to the position of the intersection point between the center line q-q' and the dotted line E-E' in the X-axis direction. When m is an even number as in this case, at the position where the common electrode 71A intersects with the dotted line E-E' in the X-axis direction, a different common electrode 71A essentially intersects with the dotted line F-F'. Further, at the position where the common electrode 71A intersects with the dotted line F-F' in the X-axis direction, a different common electrode 71A essentially intersects with the dotted line E-E'. Similarly, this relation also applies for the pixel electrodes 70. When such relation applies, m/2 pieces of the common electrodes 71A and m/2 pieces of the pixel electrodes 70 are disposed in the length of m×Pe in the X-axis direction. Therefore, the length in the Y-axis direction light-shielded by the common electrode 71A and the pixel electrode 70 can be expressed as follows by using We1 and We2.

$$m \times (We1+We2)/(2 \times \cos \alpha) \quad (12)$$

As described, the length in the Y-axis direction light-shielded by the common electrode 71B, the common electrode 71A, and the pixel electrode 70 does not change regardless of the positions in the X-axis direction. Thus, the length of the aperture section of the pixel in the Y-axis direction is constant regardless of the positions in the X-axis direction, so that moiré is not generated. The reason for being able to achieve the effect of decreasing the 3D crosstalk and suppressing the deterioration in the numerical aperture in the liquid crystal display device of the second exemplary embodiment is the same reason described in the case of the liquid crystal display device of the first exemplary embodiment.

Third Exemplary Embodiment

Figure 14:
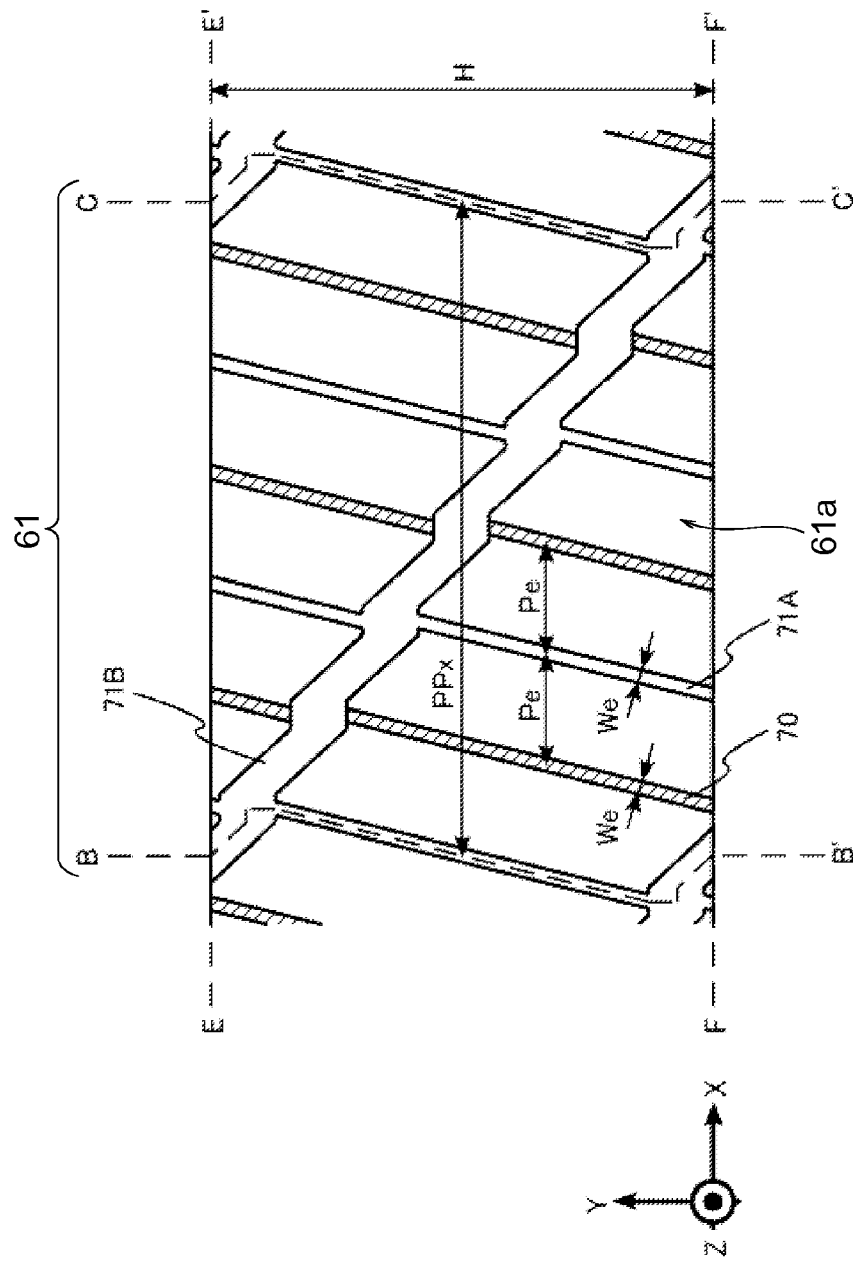
FIG. 14 is a plan view showing the layout of an aperture section of a sub-pixel of the liquid crystal display device according to a third exemplary embodiment.

A liquid crystal display device according to a third exemplary embodiment has almost the same structures as those of the liquid crystal display device according to the first exemplary embodiment, and the layout of the aperture section of the sub-pixel is different. Therefore, the pixel layout and the circuit structure of the third exemplary embodiment are the same as those of the first exemplary embodiment, and the CF substrate having the layout of FIG. 5 is also used herein. FIG. 14 shows the layout of the aperture section 61a of the sub-pixel 61 when the TFT substrate and the CF substrate are superimposed in the liquid crystal display device according to the third exemplary embodiment.

In the liquid crystal display device of the third exemplary embodiment, there is the aperture section 61a that is defined with a dotted line E-E' as well as a dotted line F-F' defining the height of the aperture section 61a of the sub-pixel 61 in the Y-axis direction and a dotted line B-B' as well as a dotted line C-C' defining the boundary of the sub-pixels 61 neighboring to each other in the X-axis direction. The dotted line E-E' and the dotted line F-F' are in parallel to the X-axis direction, and those can be defined with the BM 54 of the CF substrate 5 (FIG. 5). The common electrode 71B is disposed to divide the aperture section 61a obliquely, and the common electrode 71A and the pixel electrode 70 tilted at a with respect to the X-axis direction and have the width We are disposed alternately at a pitch of Pe in the X-axis direction. Provided that the number into which the aperture section 61a is divided in the X-axis direction with the common electrode 71A and the pixel electrode 70 is n, n is an even number. FIG. 14 shows a case where n=6. Assuming here that the common electrode 71A is disposed on one of the boundaries of the sub-pixels neighboring to each other in the X-axis direction, the common electrode 71A is essentially disposed on the other boundary. Further, although not shown, a data line is disposed under the common electrode 71B as in the case of the liquid crystal display device of the first exemplary embodiment. Furthermore, the intersection point between the center line of the common electrode 71B and the dotted line E-E' is set to be on the dotted line B-B', and the intersection point between the center line thereof and the dotted line F-F' is set to be on the dotted line C-C'.

Figure 15:
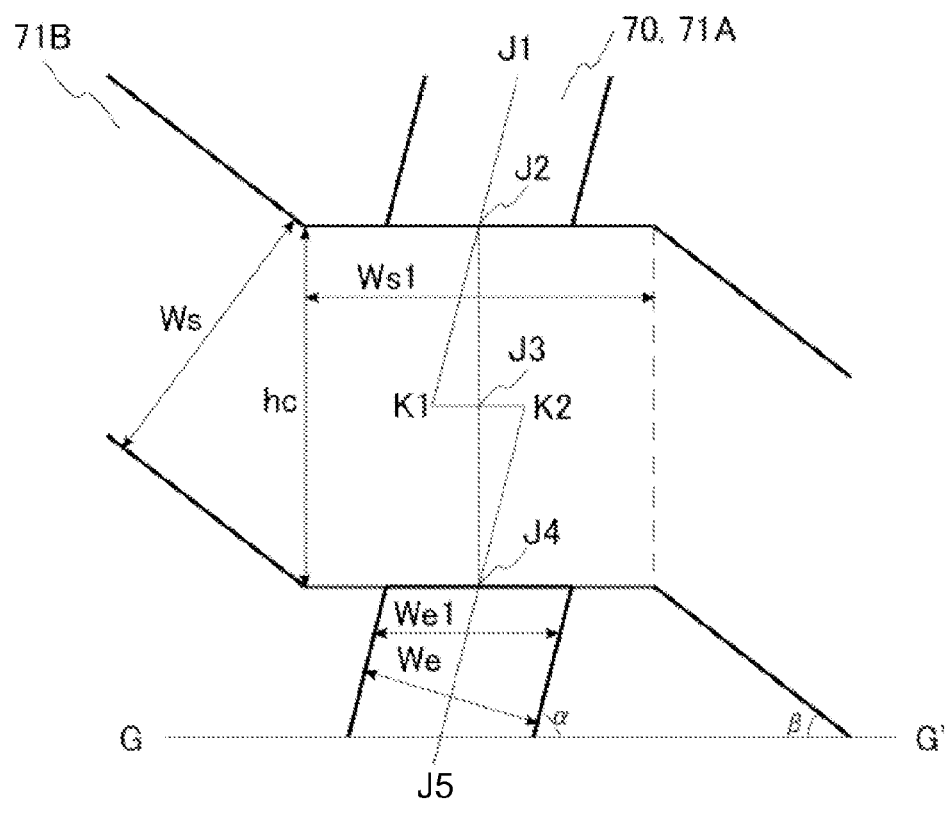
FIG. 15 is a fragmentary enlarged plan view showing the layout of the aperture section of the sub-pixel of the liquid crystal display device according to the third exemplary embodiment.

FIG. 15 is an enlarged view of the intersection part where the common electrode 71B intersects with the common electrode 71A or the pixel electrode 70, and a line G-G' is an auxiliary line in parallel to the X-axis. The common electrode 71B is tilted at an angle of β with respect to the X-axis in the part other than the intersection part, and it is disposed in parallel to the X-axis in the intersection part. When the width of the common electrode is defined as Ws as in the drawing, the length hc in the Y-axis direction in the part in parallel to the X-axis is defined as follows.

$$hc=Ws/\cos \beta \quad (13)$$

Further, the length Ws1 of the common electrode 71B in the X-axis direction in the part in parallel to the X-axis is set as equal to or longer than the length We1 that is the cut length of the common electrode 71A and the pixel electrode 70 in the X-axis direction. Furthermore, the angle β is set to satisfy the following relational expression.

$$\tan \beta = H/(PPx-(n+1)\times Ws1) \quad (14)$$

J1, J2, J3, J4, and J5 in FIG. 9 show the center lines of the pixel electrode 70 or the common electrode 71A. J2 shows the intersection point between the center line and one side of the common electrode 71B, and J4 shows the intersection point between the center line and the other side of the common electrode 71B. Note here that the positions of J2 and J4 in the X-axis direction are designed to be equivalent as the layout of the pixel electrode 70 and the common electrode 71A. With that, a segment J2-J4 becomes in parallel to the Y-axis. A segment J2-K1 is an extended line of a segment J1-J2, and a segment J4-K2 is an extended line of a segment J5-J4. Further, by having J3 as the center of the segment J2-J4, the positions of K1 and K2 in the Y-axis direction are set to be equivalent to that of J3. When the intersection parts are set as in the manner described above, a triangle J2J3K1 and a triangle J4J3K2 are congruent triangles. Thus, the length dc of the segment K1-K2 can be written as follows based on the geometric relation.

$$dc = Ws/(\cos \beta \times \tan \alpha) \quad (15)$$

Further, provided that the pitch of the common electrode 71A and the pixel electrode 70 is Pe as shown in FIG. 14, Pe is set to satisfy the following relational expression.

$$Pe = (PPx+dc)/n \quad (16)$$

Further, the relations regarding the angle α and H, PPx, dc are set to satisfy a following expression.

$$\tan \alpha = n \times (H-hc)/(m \times (PPx+dc)) \quad (17)$$

Note here that m is a natural number, and m=1 in the case of the example shown in FIG. 14. Expression (15) is substituted to dc in Expression (17). Then, α can be acquired by solving the equation.

The same method used in the liquid crystal display device of the first exemplary embodiment can be used for the driving method of the liquid crystal display device according to the third exemplary embodiment.

With the liquid crystal display device according to the third exemplary embodiment, it is possible to achieve a wide viewing angle property and to acquire an image quality with less crosstalk. Further, it is possible to achieve the effect of having no moiré, low 3D crosstalk, and low deterioration in the numerical aperture. Furthermore, it is also possible to achieve the effect of simplifying the design of the liquid crystal display device.

The reason that the liquid crystal display device according to the third exemplary embodiment can achieve a wide viewing angle property and acquire an image quality with less crosstalk is the same as the reason described in the case of the liquid crystal display device according to the first exemplary embodiment.

Next, the reason for having no moiré generated in the liquid crystal display device of the third exemplary embodiment will be described. The condition for not generating the moiré is that the length of the pixel aperture section in the Y-axis direction is equivalent regardless of the positions in the X-axis direction. Therefore, the length in the Y-axis direction of the pixel aperture section of the liquid crystal display device according to the third exemplary embodiment will be described. The length of the aperture section 61a in the Y-axis direction can be acquired by subtracting the length of the part in the Y-axis direction where the light is shielded by the common electrode 71B, the common electrode 71A, and the pixel electrode 70 from the height H of the aperture section 61a. Therefore, the light-shielding section will be described by separating it to the part shielded by the common electrode 71B and the part shielded by the common electrode 71A and the pixel electrode 70.

The length of the light-shielding section in the Y-axis direction by the common electrode 71B will be described. The common electrode 71B is constituted with a part having a tilt of the angle β with respect to the X-axis and a part in parallel to the X-axis. The length of the cut line of the part having the tilt of the angle β with respect to the X-axis cut with a line in parallel to the Y-axis is the same as hc shown in Expression 13 as can be seen in FIG. 15. Thus, the length of the part light-shielded by the common electrode 71B in the Y-axis direction is constant and is hc regardless of the positions in the X-axis direction.

Figure 16:
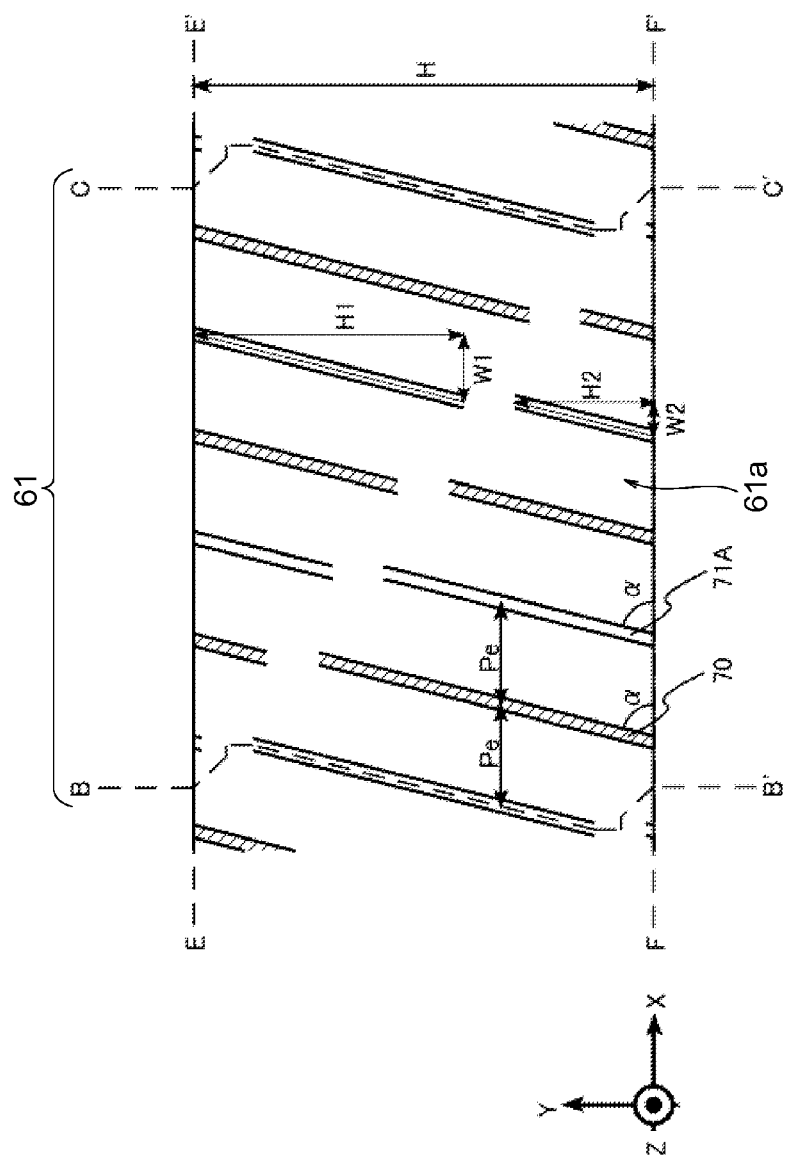
FIG. 16 is a plan view showing only a part of common electrodes and a part of pixel electrodes in the layout of the aperture section of the sub-pixel of the liquid crystal display device according to the third exemplary embodiment.

Next, the part light-shielded by the common electrode 71A and the pixel electrode 70 will be described. FIG. 16 is a layout in which the common electrode 71B part in FIG. 14 is omitted. Now, the component of the length in the X-axis direction and the component of the length in the Y-axis direction of an arbitrary common electrode 71A or an arbitrary pixel electrode 70 in a sub-pixel 61 will be investigated. The length of the part light-shielded by the common electrode 71B in the Y-axis direction is constant and is hc regardless of the positions in the X-axis direction. Therefore, provided that the length components in the Y-axis direction of the arbitrary common electrode 71A or the pixel electrode 70 are H1 or H2 as shown in FIG. 16, a following relational expression applies.

$$H1+H2 = H-hc \quad (18)$$

Thus, the length components W1 and W2 of the common electrode 71A or the pixel electrode 70 in the X-axis direction can be written as follows.

$$W1+W2 = (H1+H2)/\tan \alpha \quad (19)$$
$$= (H-hc)/\tan \alpha$$

Since α is so set that the relation of Expression (17) applies, Expression (19) can be rewritten as follows.

$$W1+W2 = m \times (PPx+dc)/n \quad (20)$$

This is the value that is m times of the pitch of the common electrode 71A and the pixel electrode 70 in the X-axis direction shown in Expression (16). This means that the point in the X-axis direction at which an arbitrary common electrode 71A or an arbitrary pixel electrode 70 intersects with the dotted line E-E' matches the point in the X-axis direction at which the neighboring m-th common electrode 71A or the pixel electrode 70 therefrom intersect with the dotted line F-F'. That is, m-pieces of the common electrodes 71A or the pixel electrodes 70 are disposed in the pitch Pe. Since all of the widths of the common electrode 71A and the pixel electrodes 70 are equivalent and the intersection points with the common electrode 71B are in the relation shown in FIG. 15, the length of the aperture section 61a in the Y-axis direction light-shielded by the common electrode 71A and the pixel electrode 70 becomes as follows regardless of the positions in the X-axis direction.

$$m \times We/\cos \alpha \quad (21)$$

As described above, the length of the aperture section 61a in the Y-axis direction light-shielded by the common electrode 71B, the common electrode 71A, and the pixel electrode 70 is constant regardless of the positions in the X-axis direction, so that moiré is not generated.

The reason for being able to achieve the effect of decreasing the 3D crosstalk and suppressing the deterioration in the numerical aperture in the liquid crystal display device of the third exemplary embodiment is the same reason described in the case of the liquid crystal display device of the first exemplary embodiment.

The reason for achieving the effect of being able to simplify the design of the liquid crystal display device according to the third exemplary embodiment will be described. In order to manufacture the liquid crystal display device, it is necessary to form a resist in a minute form by photomask and to process the material. The design of the photomask is normally done with CAD (Computer Aided Design) software. In order to input a layout pattern on the CAD software, it is necessary to input the coordinates of the vertex point and the like of the layout. The effective number of digits of the coordinate is naturally defined by the specification of the CAD software, and infinite accuracy cannot be acquired. In the liquid crystal display devices according to the first and second exemplary embodiments, those having the angles of α and β are included in the layout, and the angles are associated with the sub-pixel pitch according to a trigonometric function. The trigonometric function is basically an irrational, and it is necessary to perform some kind of approximation in designing the layout. The number of pixels normally used in the liquid crystal display device is somewhere between several hundred thousand to several million, so that a slight approximation error may be accumulated to the numerical value that cannot be ignored as the liquid crystal display device. Thus, when α and β with which the value of the trigonometric function becomes a rational can be selected, it is possible to prevent the faults described above. With the liquid crystal display device of the third exemplary embodiment, β is selected from the relation of Expression 14. In this Expression, other than the sub-pixel pitch, there is a parameter Ws1 that can be set arbitrarily by the designer. Thus, setting with which the above-described error becomes small can be done easily, so that the design can be simplified.

In the liquid crystal display device of the third exemplary embodiment, it is possible to use different values for the line widths of the common electrode 71A and the pixel electrode 70. In that case, the value of Ws1 is set to be larger than the value acquired by dividing the value of the larger line width with cos α, and m of Expression (17) is limited to an even number of 2 or larger. The reason for having no moiré is that the length of the part light-shielded by the common electrode 71A and the pixel electrode 70 in the Y-axis direction is constant regardless of the positions in the X-axis direction because of the same reason as that of the second exemplary embodiment.

Fourth Exemplary Embodiment

Figure 17:
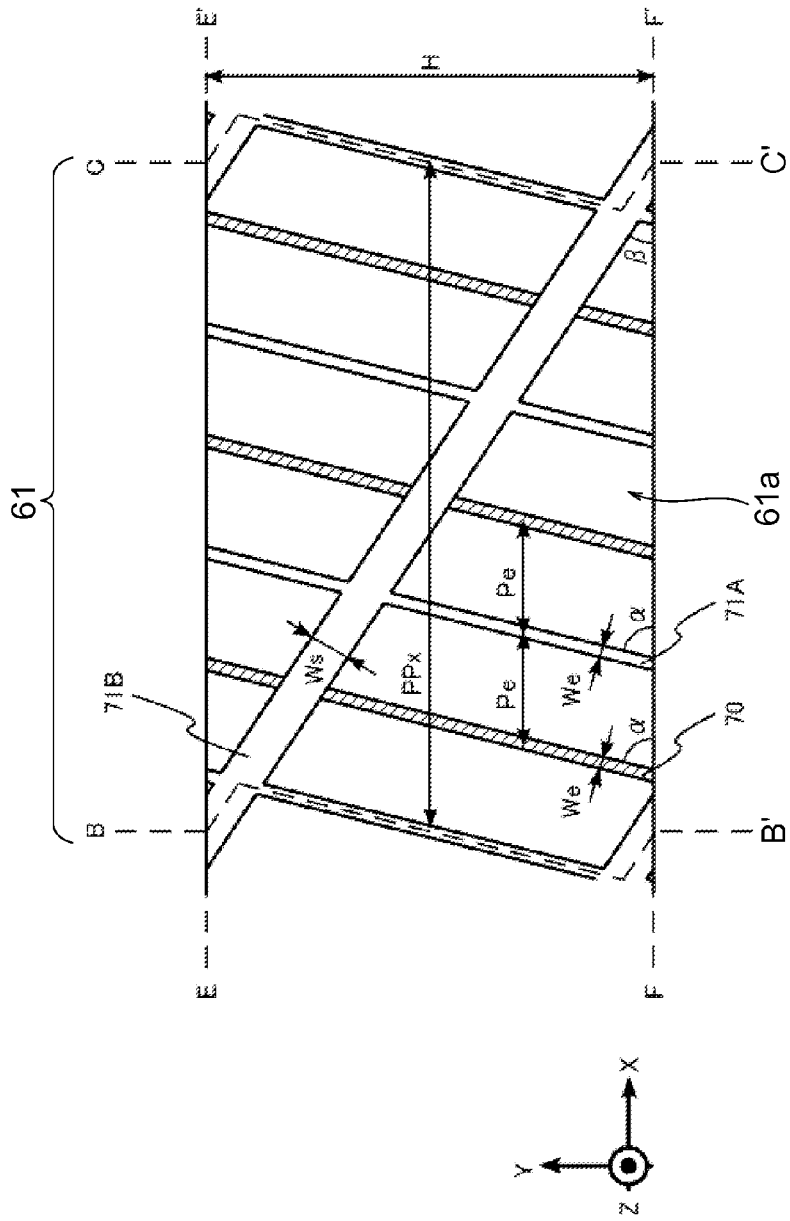
FIG. 17 is a plan view showing the layout of an aperture section of a sub-pixel of the liquid crystal display device according to a fourth exemplary embodiment.

A liquid crystal display device according to a fourth exemplary embodiment has almost the same structures as those of the liquid crystal display device according to the first exemplary embodiment, and the layout of the aperture section of the sub-pixel is different. Therefore, the pixel layout and the circuit structure of the fourth exemplary embodiment are the same as those of the first exemplary embodiment, and the CF substrate having the layout of FIG. 5 is also used herein. FIG. 17 shows the layout of the aperture section 61a of the sub-pixel 61 when the TFT substrate and the CF substrate are superimposed in the liquid crystal display device according to the fourth exemplary embodiment.

In the liquid crystal display device of the fourth exemplary embodiment, there is the aperture section 61a that is defined with a dotted line E-E' as well as a dotted line F-F' defining the height of the aperture section 61a of the sub-pixel 61 in the Y-axis direction and a dotted line B-B' as well as a dotted line C-C' defining the boundary of the sub-pixels 61 neighboring to each other in the X-axis direction. The dotted line E-E' and the dotted line F-F' are in parallel to the X-axis direction, and those can be defined with the BM 54 of the CF substrate (FIG. 5). The common electrode 71B tilted at an angle of β with respect to the X-axis and has a width Ws is disposed to divide the aperture section 61a obliquely, and the common electrode 71A and the pixel electrode 70 tilted at the angle of α with respect to the X-axis direction and have the width We are disposed alternately to divide the aperture section 61a. Provided that the number into which the aperture section 61a is divided in the X-axis direction with the common electrode 71A and the pixel electrode 70 is n, n is an even number. FIG. 17 shows a case where n=6. Assuming here that the common electrode 71A is disposed on one of the boundaries of the sub-pixels 61 neighboring to each other in the X-axis direction, the common electrode 71A is essentially disposed on the other boundary. Further, although not shown, a data line is disposed under the common electrode 71B as in the case of the liquid crystal display device of the first exemplary embodiment. Furthermore, the intersection point between the center line of the common electrode 71B and the dotted line E-E' is set to be on the dotted line B-B', and the intersection point between the center line thereof and the dotted line F-F' is set to be on the dotted line C-C'. Provided that the pitch of the sub-pixel 61 in the X-axis direction is PPx, a following relation applies regarding the angle β, PPx, and H.

$$\tan \beta = H/PPx \quad (22)$$

Figure 18:
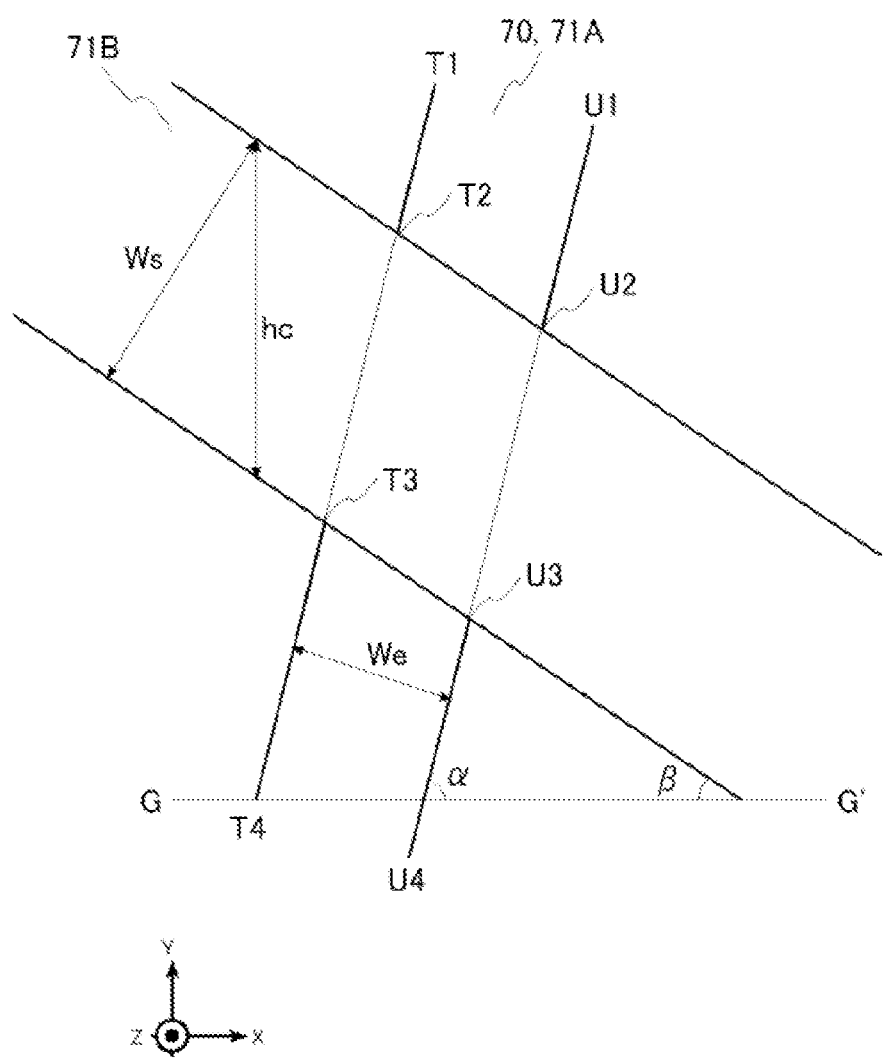
FIG. 18 is a fragmentary enlarged plan view showing the layout of the aperture section of the sub-pixel of the liquid crystal display device according to the fourth exemplary embodiment.

FIG. 18 is an enlarged view of the intersection part where the common electrode 71B intersects with the common electrode 71A or the pixel electrode 70, and a line G-G' is an auxiliary line in parallel to the X-axis. The points at which both sides of the common electrode 71A or the pixel electrode 70 intersect with one of the sides of the common electrode 71B are defined as T2, U2, and the points at which the both sides intersect with the other side of the common electrode 71B are defined as T3, U3, respectively. Defining T1, T4 as points on one of the sides of the common electrode 71A or the pixel electrode 70 and U1, U4 as points on the other side of the common electrode 71A or the pixel electrode 70, T1, T2, T3, and T4 are all set to be on the same line, and U1, U2, U3, and U4 are all set to be on the same line as well.

The layout of the intersection part of the common electrode 71B, the common electrode 71A, and the pixel electrode 70 is set in the manner described above, and the pitch Pe of the common electrode 71A and the pixel electrode 70 is set as follows.

$$Pe = PPx/n \quad (23)$$

Further, the relations regarding the angle α and H, PPx, dc are set to satisfy a following expression.

$$\tan \alpha = n \times H/(m \times PPx) \quad (24)$$

Note here that m is a natural number, and m=1 in the case of the example shown in FIG. 17. The same method used in the liquid crystal display device of the first exemplary embodiment can be used for the driving method of the liquid crystal display device according to the fourth exemplary embodiment.

With the liquid crystal display device according to the fourth exemplary embodiment, it is possible to achieve a wide viewing angle property and to acquire an image quality with less crosstalk. Further, it is possible to achieve the effect of having no moiré, low 3D crosstalk, and low deterioration in the numerical aperture. Furthermore, it is also possible to achieve the effect of simplifying the design of the liquid crystal display device.

The reason that the liquid crystal display device according to the fourth exemplary embodiment can achieve a wide viewing angle property and acquire an image quality with less crosstalk is the same as the reason described in the case of the liquid crystal display device according to the first exemplary embodiment.

Next, the reason for having no moiré generated in the liquid crystal display device of the fourth exemplary embodiment will be described. It is already described that moiré is generated when the length of the aperture section 61 of the pixel in the Y-axis direction fluctuates depending on the positions in the X-axis direction. The extent of the moiré is determined according to the fluctuation amount. Thus, the length in the Y-axis direction of the aperture section 61a of the liquid crystal display device according to the fourth exemplary embodiment will be investigated. The liquid crystal display device according to the fourth exemplary embodiment has the layout in which the light-shielding sections formed with the common electrode 71B, the common electrode 71A, and the pixel electrode 70 is disposed on the aperture sections 61a having the constant height in the Y-axis direction. This will be described by separating it into some regions.

First, the region where the common electrode 71B, the common electrode 71A, and the pixel electrode 70 do not intersect with each other will be described. The part where the common electrode 71A and the pixel electrode 70 intersect with the dotted line E-E' and the dotted line F-F' will be investigated. The position in the X-axis direction of the point at which the center line of an arbitrary common electrode 71A or an arbitrary pixel electrode 70 intersects with the dotted line F-F' and the position in the X-axis direction of the point at which the center line intersect with the dotted line E-E' can be expressed as follows with the height H and the angle $\alpha$.

$$H/\tan \alpha \tag{25}$$

Note here that $\tan \alpha$ has the relation of Expression (24), so that it can be rewritten as follows.

$$m \times PPx/n \tag{26}$$

This is the value that is m times of the pitch of the common electrode 71A and the pixel electrode 70 in the X-axis direction shown in Expression (23). This means that the point in the X-axis direction at which an arbitrary common electrode 71A or an arbitrary pixel electrode 70 intersects with the dotted line E-E' matches the point in the X-axis direction at which the neighboring m-th electrode therefrom intersect with the dotted line F-F'. That is, m-pieces of the common electrodes 71A or the pixel electrodes 70 are disposed in the pitch Pe. Therefore, the length of the aperture section 61a light-shielded in the Y-axis direction in the region having no intersection part becomes as follows.

$$Ws/\cos \beta + m \times We/\cos \alpha \tag{27}$$

Figure 19:
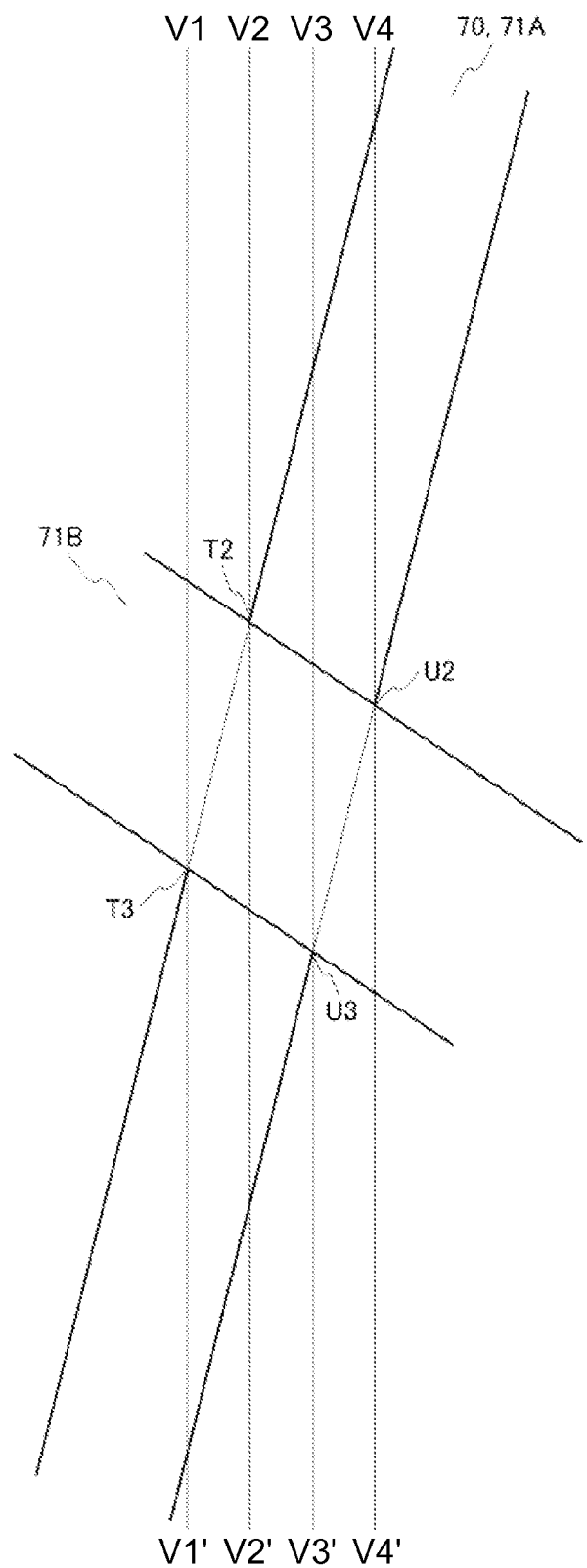
FIG. 19 is a fragmentary enlarged plan view showing the layout of the aperture section of the sub-pixel of the liquid crystal display device according to the fourth exemplary embodiment.

Next, the region including the intersection part will be investigated. The region including the intersection part is sectioned into still smaller regions. FIG. 19 is an enlarged view of the vicinity of the intersection part of an arbitrary common electrode 71B or an arbitrary pixel electrode 70 and a common electrode 71A, in which the points T2, T3, U2, and U3 mean the same as those of FIG. 18. An auxiliary line V1-V1' is a line in parallel to the Y-axis passing through the point T3, and an auxiliary line V2-V2' is a line in parallel to the Y-axis passing through the point T2. An auxiliary line V3-V3' is a line in parallel to the Y-axis passing through the point U3, and an auxiliary line V4-V4' is a line in parallel to the Y-axis passing through the point U2. The region between the auxiliary line V1-V1' and the auxiliary line V2-V2' will be investigated. The length in the Y-axis direction of the light-shielding section in the auxiliary line V1-V1' is equivalent to Expression (27), and it becomes shorter as reaching closer to the auxiliary line V2-V2'. Similarly, in the region between the auxiliary line V3-V3' and the auxiliary line V4-V4', the length in the Y-axis direction of the light-shielding section in the auxiliary line V4-V4' is equivalent to Expression (27), and it becomes shorter as reaching closer to the auxiliary line V3-V3'. In the region between the auxiliary line V2-V2' and the auxiliary line V3-V3', the length in the Y-axis direction of the light-shielding section is constant. The positions of the points T2 and U3 in the X-axis direction change according to the width Ws, the angle $\beta$, the width We, and the angle $\alpha$. When the positions of the points T2 and U3 in the X-axis direction match with each other, the length of the light-shielding section in the Y-axis direction becomes the shortest. The value thereof can be expressed as follows.

$$Ws/\cos \beta + (m-1) \times We/\cos \alpha \tag{28}$$

Since the positions of the points T2 and U3 in the X-axis direction match with each other, this state is evident considering that the following relation applies.

$$Ws/\cos \beta = We/\cos \alpha \tag{29}$$

Figure 20:
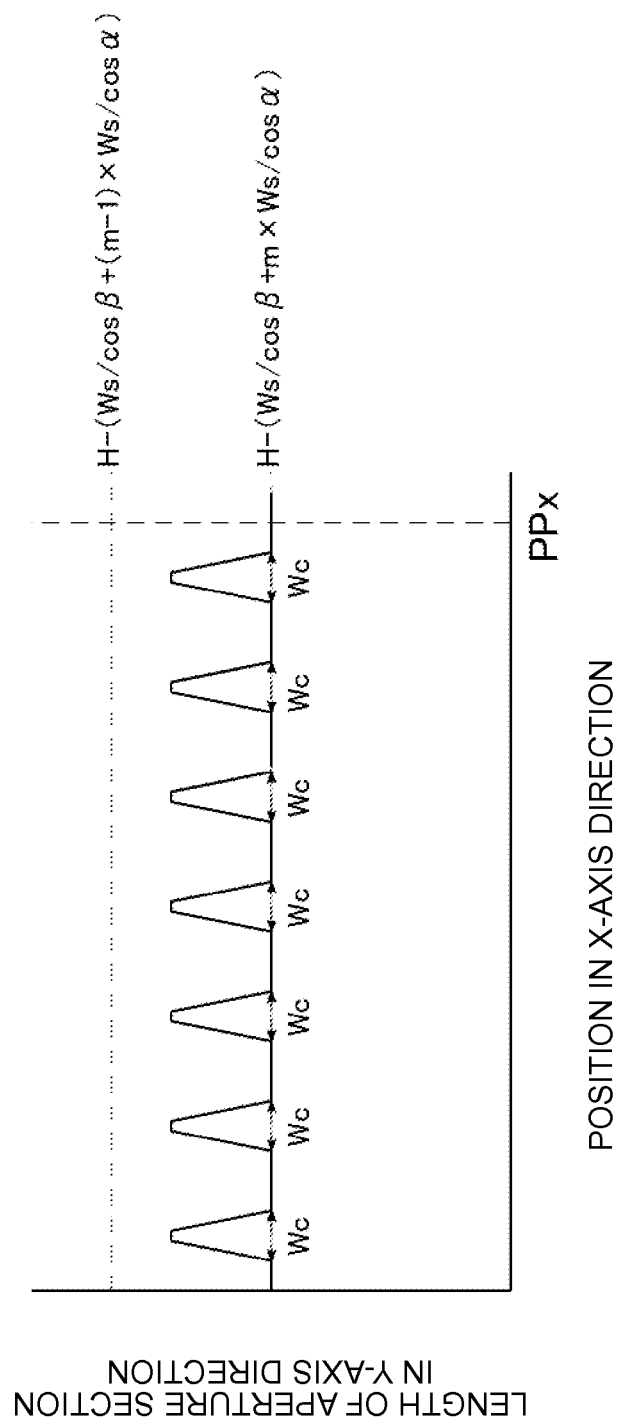
FIG. 20 is a graph showing the X-axis direction dependency of the length in the X-axis direction of the aperture section of the sub-pixel of the liquid crystal display device according to the fourth exemplary embodiment.

FIG. 20 shows a graph of the positional dependency in the X-axis direction of the length of the aperture section of a single pixel in the Y-axis direction, which is acquired based on the result described above. That is, in the pitch PPx of the sub-pixel in the X-axis direction, there are n-pieces of regions where the length of the aperture section in the Y-axis direction is longer than the others. Here, the width Wc of the region where the length of the aperture section 61a in the Y-axis direction is longer than the others will be investigated. In FIG. 18, it is the X-axis direction component of the distance of the points T3 and U2, and it can be expressed as follows based on the geometrical relation.

$$Wc=(Ws \times \cos \alpha + We \times \cos \beta)/\sin(\alpha+\beta) \tag{30}$$

Now, the specific value of the width Wc will be investigated. The exemplary object of the fourth exemplary embodiment is to improve the image quality of the naked-eye type display device which displays three-dimensional videos mainly suited for mobile apparatuses. In the liquid crystal display device used for the mobile apparatus, the pixel pitch is mostly 200 μm or less in response to the recent demand for achieving high definition. When a 2-viewpoint display device displaying three-dimensional videos is assumed here, the ratio of the PPx and PPy as the pitches of the sub-pixels in the fourth exemplary embodiment is 3:2. Further, provided that the height of the aperture section of the sub-pixel is about ⅔ of PPy, the ratio of the PPx and H is 9:4. The angle $\beta$ in the fourth exemplary embodiment satisfies the relation of Expression (22), the value of the angle $\beta$ is about 24 degrees. The width We of the common electrode 71A is about 5 μm considering the process accuracy and the like, and the width Ws of the common electrode 71B is about 15 μm considering the object for light-shielding the electric field from the data line 62. It is common to set the angle $\alpha$ as about 75 to 85 degrees considering that the initial torque is applied to the liquid crystal molecules, and the value thereof is set as 80 degrees. When those numerical values are substituted to Expression (30), the width Wc is 7.4 µm. In the fourth exemplary embodiment, the cylindrical lens 31 can be used as a means for spatially separating and projecting the light. When the cylindrical lens 31 is used, the width of the light condensed on the interface can be controlled through shifting the focal distance from the interface between the CF substrate 5 and the liquid crystal layer 55 (FIG. 1). Therefore, through setting the width to be wider than Wc, ununiformity of the light can be leveled. The value of the width Wc is as small as 7.4 µm that is acquired earlier, the ununiformity of the luminance caused due to the ununiformity of the lengths of the apertures in the Y-axis direction shown in FIG. 20 can be leveled sufficiently. Therefore, it becomes hard to be visually recognized as moiré.

The reason for being able to achieve the effect of decreasing the 3D crosstalk and suppressing the deterioration in the numerical aperture in the liquid crystal display device of the fourth exemplary embodiment is the same reason described in the case of the liquid crystal display device of the first exemplary embodiment.

The reason for achieving the effect of being able to simplify the design of the liquid crystal display device according to the fourth exemplary embodiment is the same as the reason described in the case of the liquid crystal display device of the third exemplary embodiment. For designing the photomask of the liquid crystal display device, it is important to transform the part defined with an irrational such as a trigonometric function in the layout to a limited effective number of digits by making it errorless as much as possible. With the liquid crystal display device of the fourth exemplary embodiment, there are many variables that can be set arbitrarily by the designer existing in relational Expressions (22) and (24) which define the angles $\alpha$ and $\beta$. Examples thereof may be H, n, and m. This means that the adjustable ranges of $\alpha$ and $\beta$ are wide. Therefore, the design can be simplified.

With the liquid crystal display device of the fourth exemplary embodiment, it is possible to use different values for the line widths of the common electrode 71A and the pixel electrode 70. In that case, m in Expression (24) may be limited to an even number of 2 or larger, Example 1

Example 1 shown herein is a specific manufacturing method of the liquid crystal display device of first to fourth exemplary embodiments. As a way of example, shown is a method of a case where the TFT substrate 4 (FIG. 4) of the liquid crystal display device according to the first exemplary embodiment is manufactured by using an LTPS process (Low Temperature Poly Silicon). FIGS. 21 to 25 are plan views showing each step of the manufacturing process.

FIG. 21 shows the layout of a polysilicon film to be one of the electrodes of the TFT 64 and the storage capacitance 66 shown in FIG. 22. The polysilicon film can be acquired by depositing an a-Si (amorphous silicon) film as a precursor film on a glass substrate on which a base film for preventing contamination is deposited, and by recrystallizing it with an excimer laser annealing method or the like. Patterning is performed thereon, and impurity is diffused except for the part where the channel of the TFT 64 is to be formed. A gate insulating film is deposited after completing the patterning of the polysilicon film. As the gate insulating film, it is possible to use a single-layer film of $SiO_2$, a laminated film of $SiO_2$ and SiN, or the like.

FIG. 22 shows the layout at the stage where a gate metal film and a first contact are formed. The gate metal film is deposited on the gate insulating film, and patterning is performed. The gate line 63 and the storage capacitance line 67 are formed with the gate metal film. The TFT 64 and the storage capacitance 66 are formed in a part where the gate metal film and the polysilicon film overlap with each other. As the gate metal film, Cr, Al, W, Si, or a laminated film of two or more kinds of those can be used. After patterning the gate metal film, a first interlayer film is deposited. As the first interlayer film, $SiO_2$, SiN, or a laminated film of those can be used. Thereafter, a first contact 41 for making the polysilicon film and the wiring metal film electrically conductive is formed by going through the gate insulating film and the first interlayer film.

Figure 23:
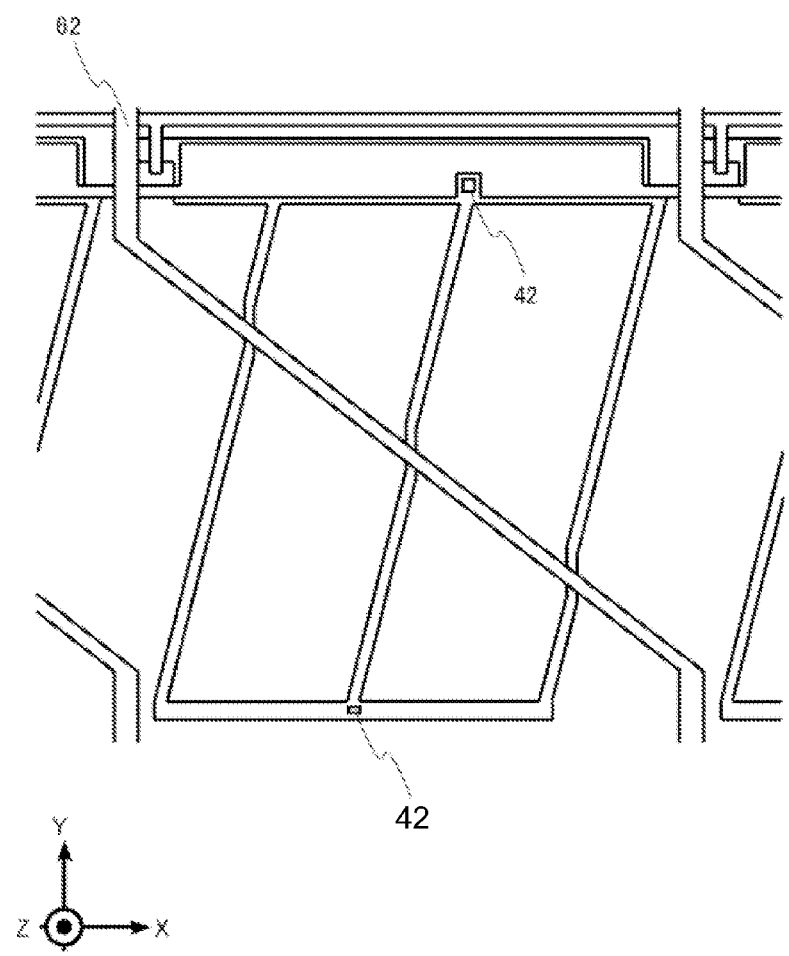
FIG. 23 is an illustration for describing the manufacture process of the liquid crystal display device of Example 1, which is a plan view showing the point where creation of a second contact is completed.

FIG. 23 shows the layout at the stage where a wiring metal film and a second contact are formed. The wiring metal film is deposited on the first interlayer film, and patterning is performed. The data line 62 is formed with the wiring metal film. As the wiring metal film, a laminated film of a metal such as Cr or Al and a metal such as Mo or Ti can be used. After patterning the wiring metal film, a second interlayer film is deposited. As the second interlayer film, $SiO_2$, SiN, acryl, or a laminated film of two or more kinds of those can be used. Thereafter, a second contact 42 for making the polysilicon film and the pixel electrode electrically conductive is formed by going through the gate insulating film, the first interlayer film, and the second interlayer film.

Figure 24:
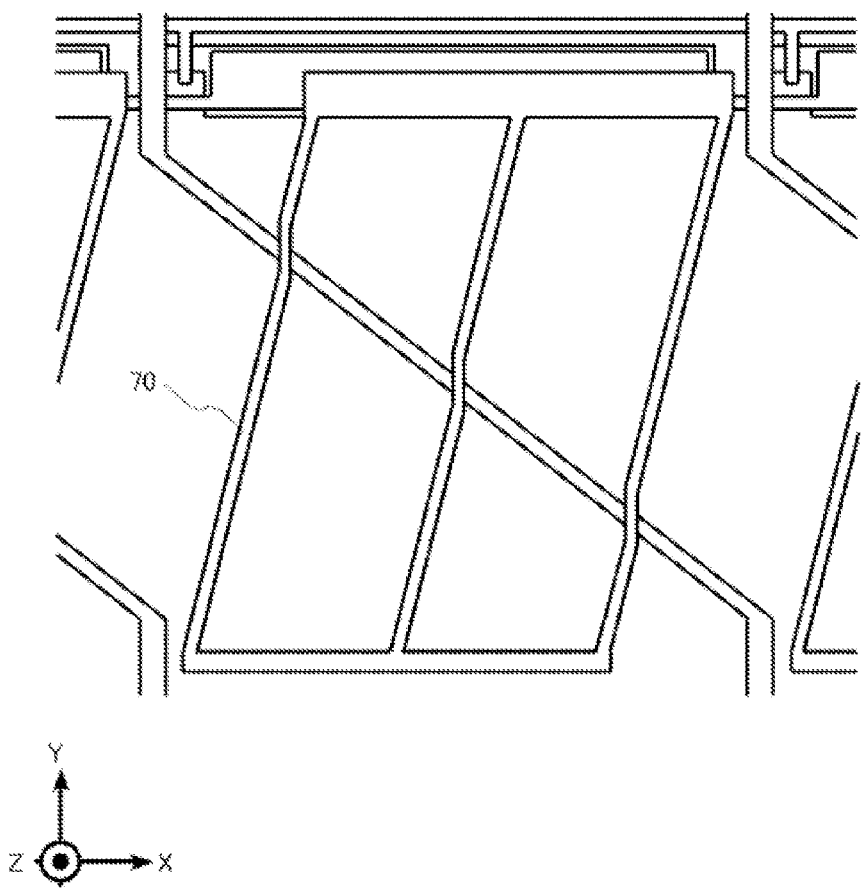
FIG. 24 is an illustration for describing the manufacture process of the liquid crystal display device of Example 1, which is a plan view showing the point where deposition of a third interlayer film is completed.

FIG. 24 shows the layout at the stage where the pixel electrode 70 is formed. As the pixel electrode 70, a transparent conductive film such as ITO (Indium Tin Oxide) or a metal film such as Al can be used. The pixel electrode 70 is electrically connected to the TFT 64 (FIG. 22) via the second contact 42 (FIG. 23). After patterning the pixel electrode 70, a third interlayer is deposited.

Figure 25:
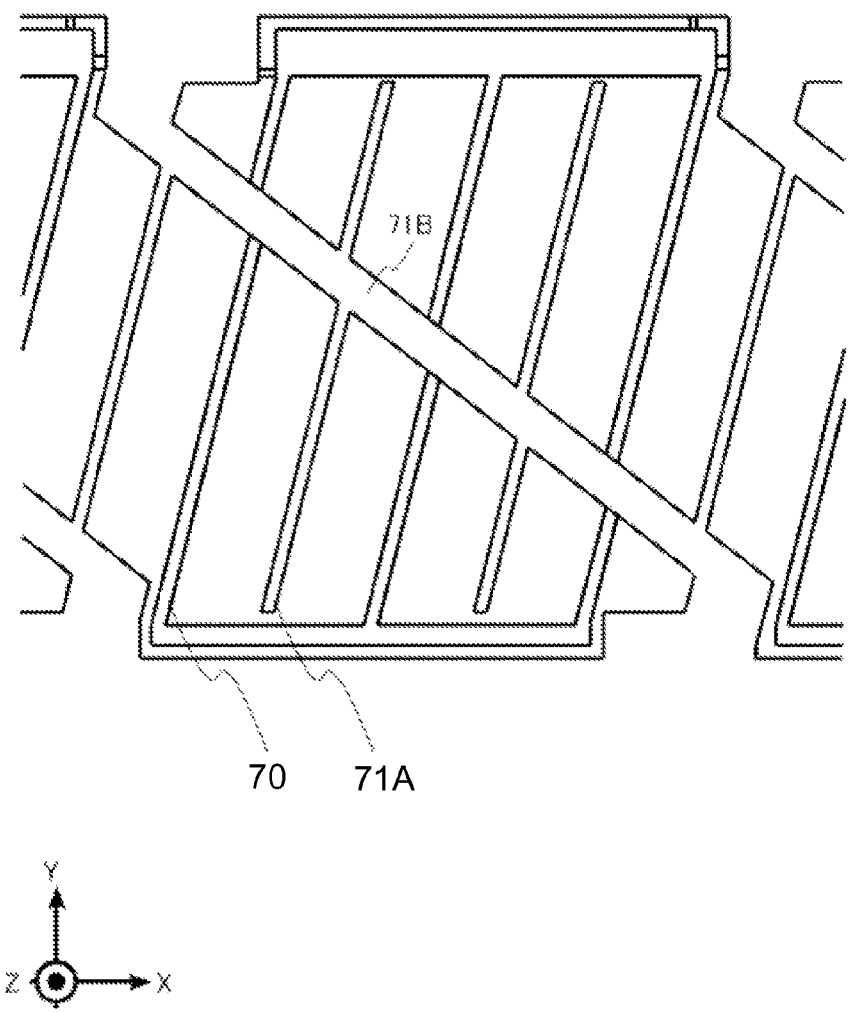
FIG. 25 is an illustration for describing the manufacture process of the liquid crystal display device of Example 1, which is a plan view showing the point where patterning of a common electrode film is completed.

FIG. 25 shows the layout at the stage where the common electrodes 71A and 71B are formed. As the common electrode, a transparent conductive film such as ITO or a metal film such as Al can be used. As can be seen from FIG. 25, the common electrodes 71A and 71B are connected to the sub-pixels neighboring thereto on the top and bottom sides and the left and right sides. Although not shown, the common electrodes are electrically connected to the wiring metal film in the periphery of the liquid crystal panel, and connected to the common potential wiring 68 (FIG. 3).

Figure 26:
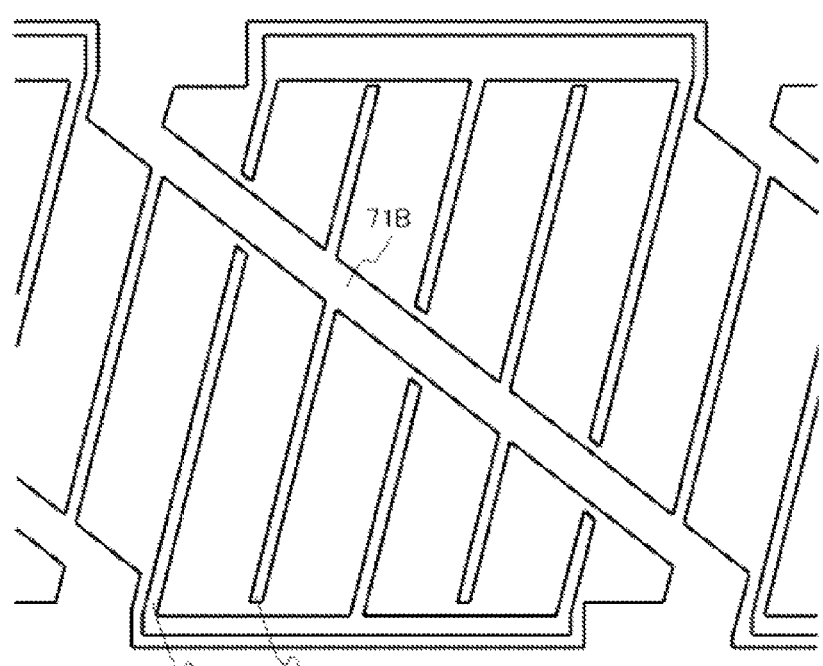
FIG. 26 is a plan view showing the layout of common electrodes and pixel electrodes of the liquid crystal display device of Example 1.
Figure 27:
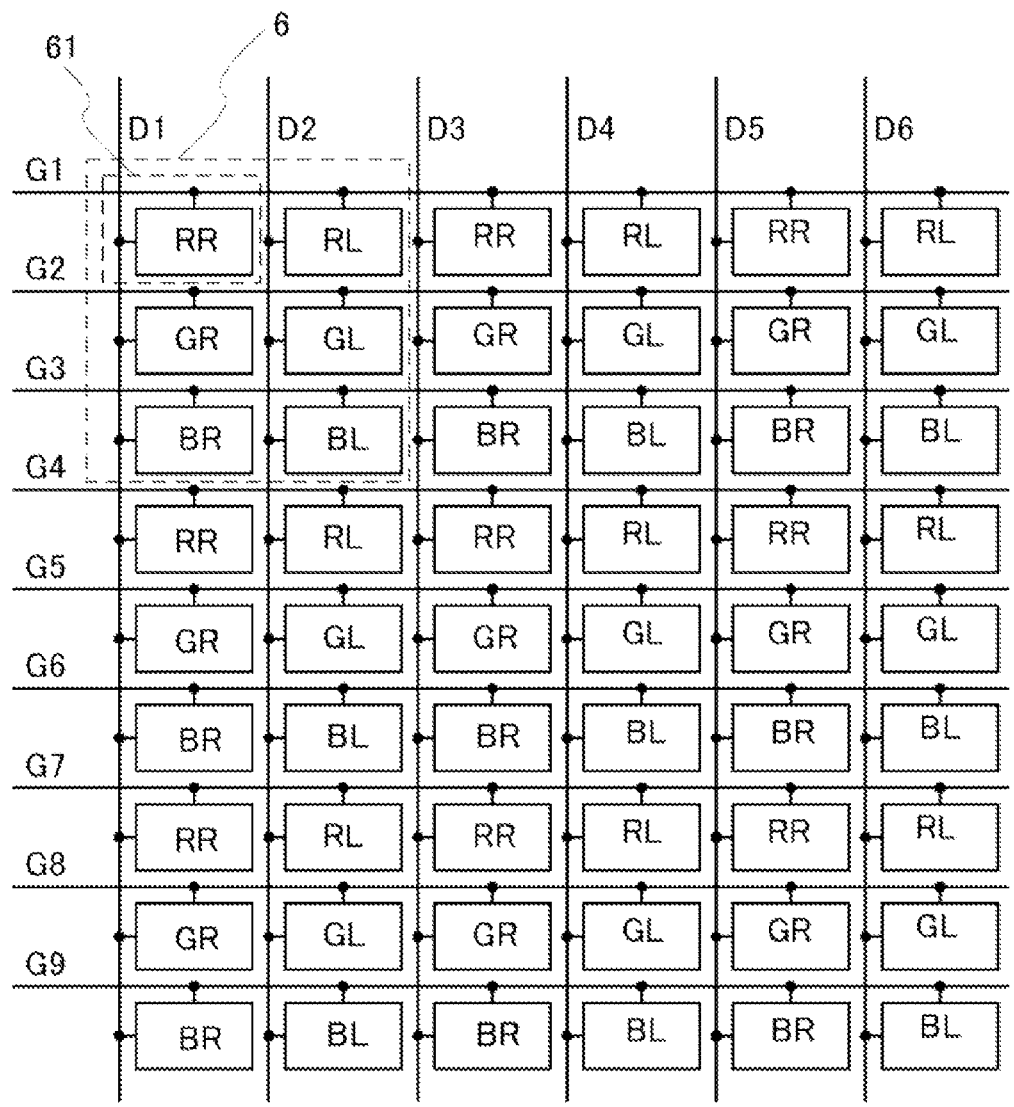
FIG. 27 is a model illustration showing the pixel layout of a liquid crystal display device according to a related technique.
Figure 28:
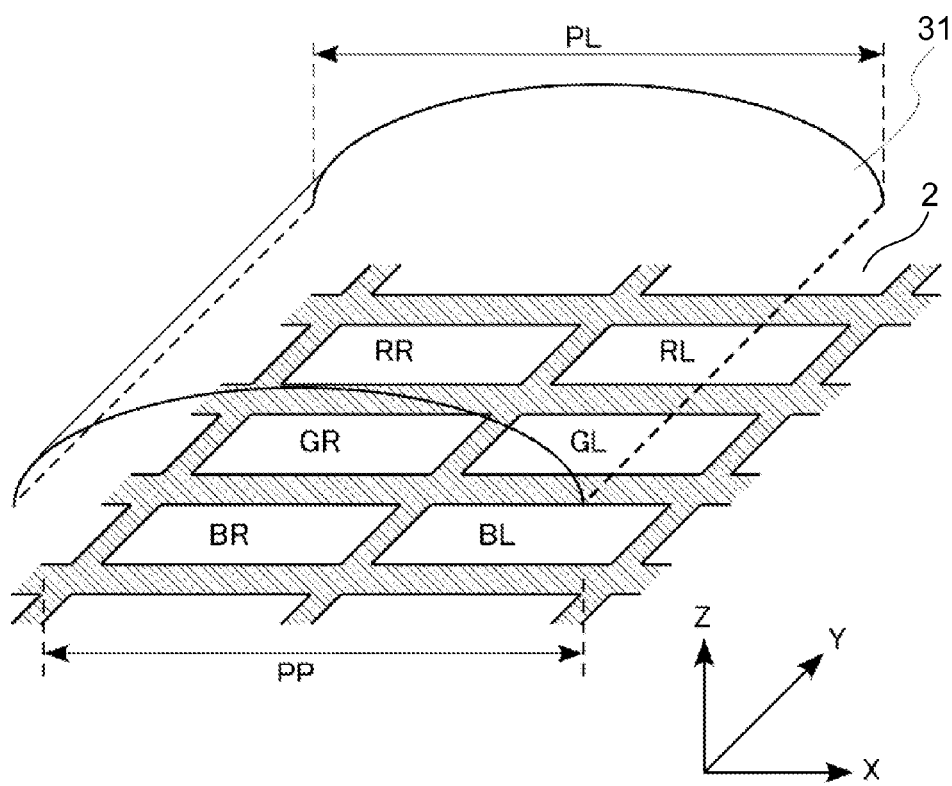
FIG. 28 is a solid view showing the structure of the liquid crystal display device according to the related technique.
Figure 29:
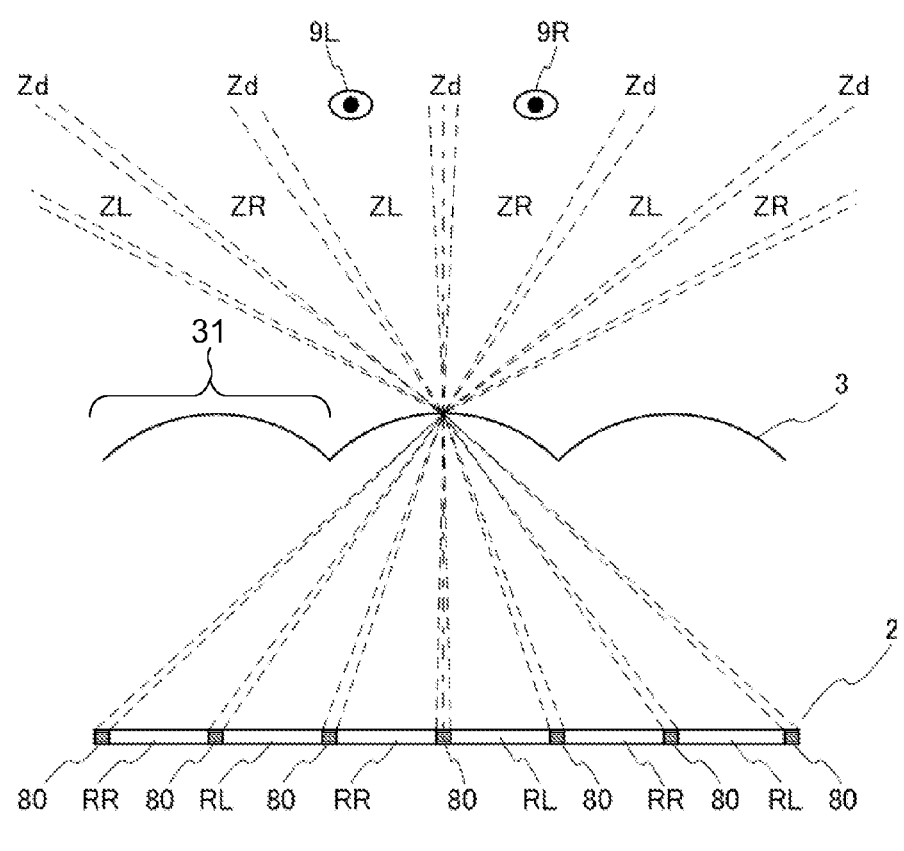
FIG. 29 is a chart for describing the locus of the light emitted from the liquid crystal device of the related technique.
Figure 30:
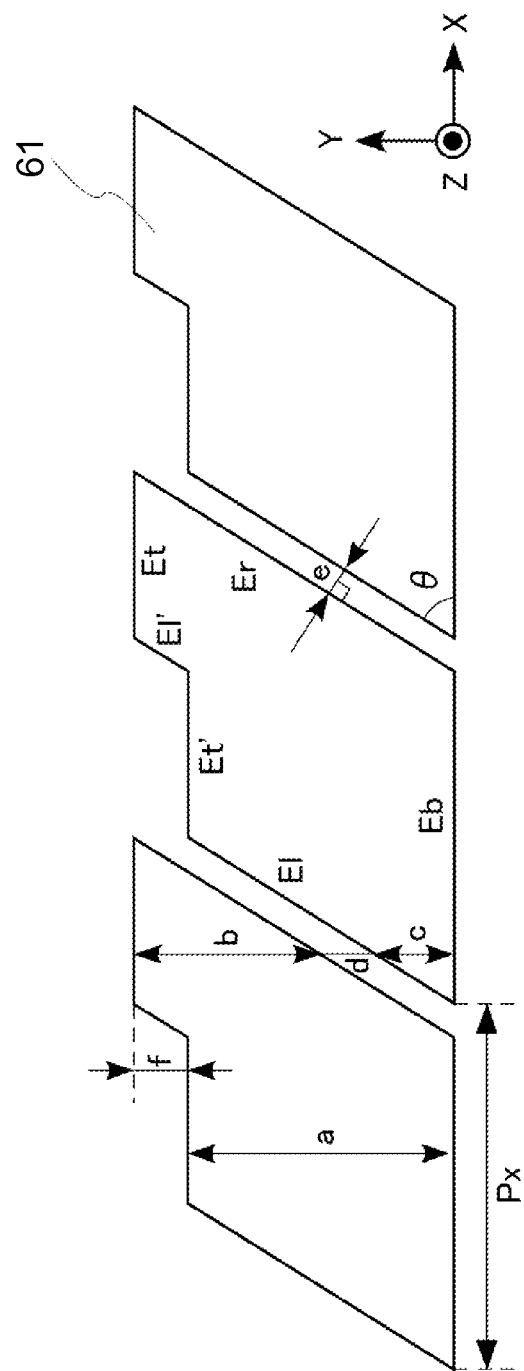
FIG. 30 is a plan view showing a pixel aperture section of the liquid crystal display device according to the related technique.
Figure 31:
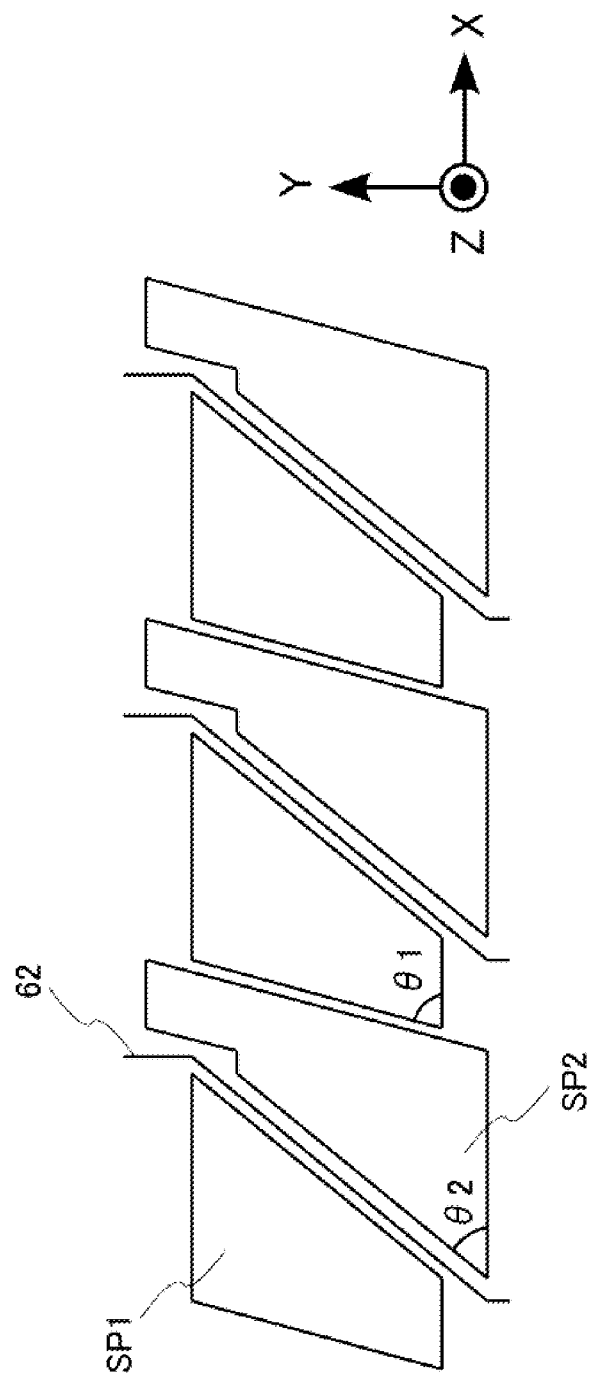
FIG. 31 is a plane view showing a pixel aperture section of the liquid crystal display device according to the related technique.
Figure 32:
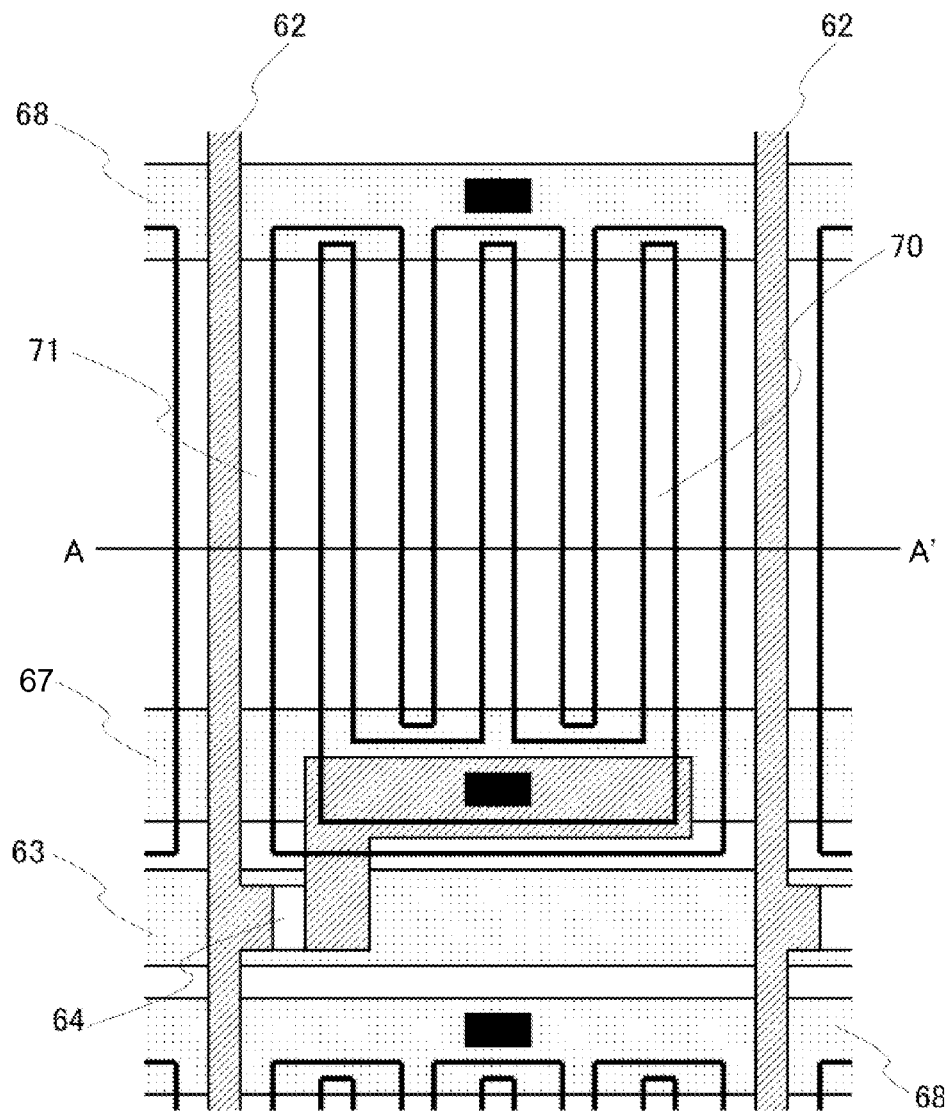
FIG. 32 is a plan view showing the pixel layout of the liquid crystal display device according to the related technique.
Figure 33:
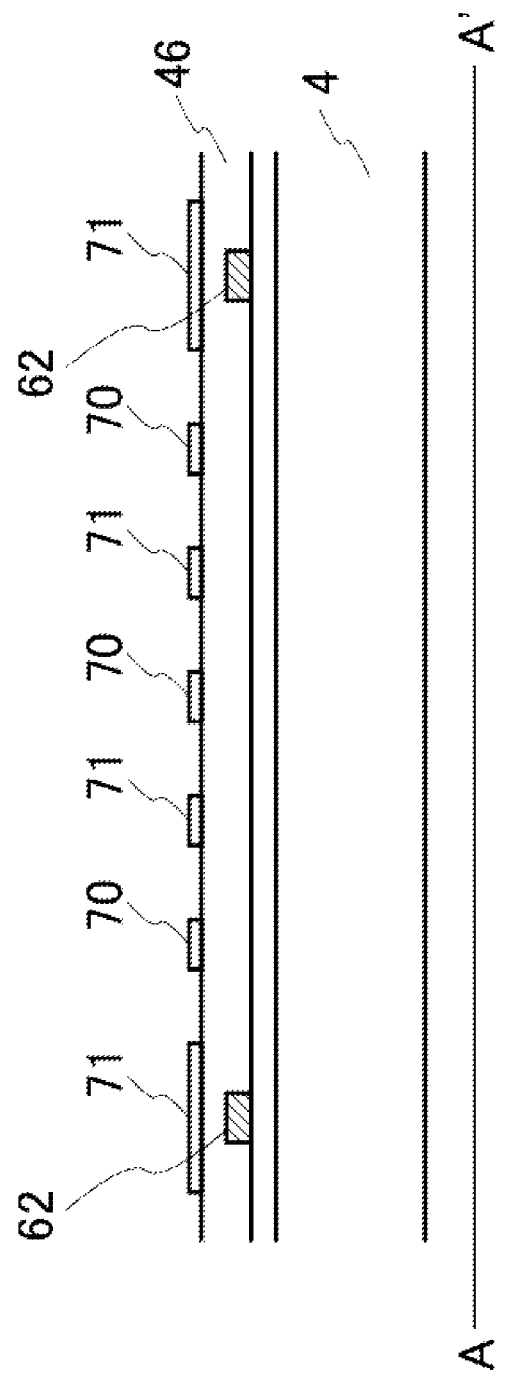
FIG. 33 is a sectional view showing the structure of the liquid crystal display device according to the related technique.

The above-described method shows an example of forming the pixel electrode and the common electrode with different metal layers. However, the pixel electrode and the common electrode can also be formed with a same metal layer. FIG. 26 shows the layout of a metal film in such case where the pixel electrode and the common electrode are formed therewith. After completing the stage of FIG. 23, the metal film to be the pixel electrode and the common electrode is deposited. The metal film is patterned as in FIG. 26 to acquire the pixel electrode and the common electrode. As the metal film, a transparent conductive film such as ITO or a metal film such as Al can be used. In that case, there is generated a part where the pixel electrode 70 is divided by the common electrode 71B. However, the divided pixel electrodes 70 can be electrically connected to each other by disposing a polysilicon layer in which impurity is inserted to overlap with the pixel electrode 70 as shown in FIG. 21 and providing the second contact 42 at two points as shown in FIG. 23.

While the manufacturing example using the LTPS process is shown herein, it is also possible to use any of the processes such as an a-SiTFT process, an oxide semiconductor process, or an organic TFT process. Further, the types of the metal film and the insulating film are not limited to those shown as the specific example. The important thing is to embody the layouts of the liquid crystal display devices of the first to fourth exemplary embodiments, and it is not influenced by the means and materials used therefor.

Further, with the first to fourth exemplary embodiments and Example 1, it is possible to use a parallax barrier other than the lens array sheet. When the parallax barrier is used, the cost can be cut since manufacturing is easy. However, most of light emitted from the liquid crystal display device is shielded by the parallax barrier, so that the light use efficiency becomes deteriorated. The type to be used is determined according to the usage of the liquid crystal display device.

While the present invention has been described above by referring to each of the embodiments shown in the drawings, the present invention is not limited only to each of the embodiments described above. Regarding the structures and details of the present invention, various changes and modifications occurred to those skilled in the art can be applied. Further, the present invention includes the structures acquired by properly and mutually combining a part of or a whole part of the structures of each of the above-described embodiments.

In other words, it is the object of the present invention to reduce the moiré and to achieve high numerical aperture at the same time in a case where the IPS (In-Plane Switching) mode is used for achieving a wide viewing angle property in the liquid crystal display device which displays three-dimensional images by using the cylindrical lens array or the parallax barrier.

In other words, in the liquid crystal display device, sub-pixels are disposed in an array form in the first direction and the second direction orthogonal to each other, a plurality of gate lines are disposed in the second direction, an optical element for distributing the light to the second direction is disposed on the liquid crystal display device, liquid crystal molecules of the liquid crystal display device are controlled by an electric field almost in parallel to the surface of the liquid crystal display device, and the data line is disposed to obliquely divide the sub-pixel at a position different from the boundary between the sub-pixels neighboring to each other in the second direction. Through disposing the data line to obliquely divide the sub-pixels as described above, the data line can have a small angle with respect to the second direction. Thus, the numerical aperture is not deteriorated greatly even when the lengths of apertures of the sub-pixels in the first direction are set to be constant.

While a part of or a whole part of the exemplary embodiments disclosed above can be summarized as follows, the present invention is not necessarily limited only to the following structures.

(Supplementary Note 1)

A liquid crystal display device which includes: a first substrate; a second substrate; and a liquid crystal layer sandwiched between the first substrate and the second substrate, liquid crystal molecules thereof being controlled by an electric field that is almost in parallel to those substrates, wherein the liquid crystal display device includes:
sub-pixels disposed in an array form in a first direction and a second direction orthogonal to each other;
an optical element which distributes light in the second direction;
a gate line disposed by being extended to the second direction; and
a data line disposed to divide the sub-pixel obliquely at a position different from a boundary between the sub-pixels neighboring to each other in the second direction.

(Supplementary Note 2)

The liquid crystal display device as depicted in Supplementary Note 1, wherein:
the sub-pixel includes an aperture section where light is transmitted;
a plurality of first electrodes, a plurality of second electrodes, and a single third electrode are disposed in the aperture section;
the first electrodes and the second electrodes are disposed alternately at an equivalent interval obliquely at a first angle with respect to the second direction;
the third electrode is disposed obliquely at a second angle with respect to the second direction;
the electric field is generated by a potential difference between the first electrodes and the second electrodes; and
the data line is covered by the third electrode via an insulating film.

(Supplementary Note 3)

The liquid crystal display device as depicted in Supplementary Note 2, wherein:
the first electrodes and the second electrodes have a part intersecting with the third electrode in the aperture section; and
a position in the second direction where the first electrodes and the second electrode intersect with one side of the third electrode matches a position in the second direction where the first electrodes and the second electrodes intersect with the other side of the third electrode.

(Supplementary Note 4)

The liquid crystal display device as depicted in Supplementary Note 3, wherein the third electrode is in parallel to the second direction in the intersection part.

(Supplementary Note 5)

The liquid crystal display device as depicted in Supplementary Note 2, 3, or 4, wherein:
the first electrodes are pixel electrodes to which a voltage according to each of the sub-pixels is applied; and
the second electrodes and the third electrode are common electrodes to which a common voltage is applied to all the sub-pixels.

(Supplementary Note 6)

The liquid crystal display device as depicted in Supplementary Note 2, 3, 4, or 5, wherein:
the first substrate is a TFT substrate in which a TFT is formed for each of the sub-pixels;
the second substrate is a color filter substrate in which a filter corresponding to the sub-pixel is formed;
the optical element is a lens array sheet constituted with a plurality of cylindrical lenses having axial direction in the first direction;
the TFT includes a gate, a source, and a drain; and
the gate line is connected to the gate, the data line is connected to the source, and the pixel electrodes are connected to the drain.

(Supplementary Note 7)

A liquid crystal display device including liquid crystal sandwiched between a first substrate and a second substrate, wherein:
sub-pixels are disposed in an array form in a first direction and a second direction orthogonal to each other;
a plurality of gate lines extending in the second direction are disposed on the first substrate;
an optical element for distributing light in the second direction is disposed on the liquid crystal display device;
liquid crystal molecules of the liquid crystal display device are controlled by an electric field almost in parallel to the surface of the liquid crystal display device; and a data line is disposed to divide the sub-pixels obliquely at positions different from the boundaries between the sub-pixels neighboring to each other in the second direction.

(Supplementary Note 8)

The liquid crystal display device as depicted in Supplementary Note 7, wherein a plurality of first electrodes, a plurality of second electrodes, and a third electrode are disposed in an aperture section of the sub-pixel;

the plurality of first electrodes and the plurality of second electrodes are alternately disposed at an equal interval obliquely at a first angle with respect to the second direction;

the third electrode is disposed obliquely at a second angle with respect to the second direction;

the electric field is generated by a potential difference between the first electrodes and the second electrodes; and the data line is covered by the third electrode via an insulating film.

(Supplementary Note 9)

The liquid crystal display device as depicted in Supplementary Note 8, wherein the first electrode and the second electrode have a part where the third electrode intersects in the aperture section of the sub-pixel; and a position in the second direction where the first electrode and the second electrode intersect with one side of the third electrode matches a position in the second direction where the first electrode and the second electrode intersect with the other side of the third electrode.

(Supplementary Note 10)

The liquid crystal display device as depicted in Supplementary Note 8, wherein:

the first electrode and the second electrode have a part where the third electrode intersects in the aperture section of the sub-pixel;

the third electrode is in parallel to the second direction in the intersection part; and a position in the second direction where the first electrode and the second electrode intersect with one side of the third electrode matches a position in the second direction where the first electrode and the second electrode intersect with the other side of the third electrode.

What is claimed is:

1. A liquid crystal display device, comprising: a first substrate; a second substrate; and a liquid crystal layer sandwiched between the first substrate and the second substrate, liquid crystal molecules thereof being controlled by an electric field that is almost in parallel to those substrates, wherein the liquid crystal display device includes:

sub-pixels disposed in an array form in a first direction and a second direction orthogonal to each other;

an optical element which distributes light in the second direction;

a gate line disposed by being extended to the second direction;

a data line disposed to divide the sub-pixel obliquely at a position different from a boundary between the sub-pixels neighboring to each other in the second direction;

the sub-pixel includes an aperture section where light is transmitted;

a plurality of first electrodes, a plurality of second electrodes, and a single third electrode are disposed in the aperture section;

the first electrodes and the second electrodes are disposed alternately at an equivalent interval obliquely at a first angle with respect to the second direction;

the third electrode is disposed obliquely at a second angle with respect to the second direction;

the data line is disposed under the third electrode via an insulating film;

the first electrodes and the second electrodes have an intersection part intersecting with the third electrode and the data line in the aperture section;

at the intersection part, a position in the second direction where the first electrodes intersect with one side of the third electrodes matches a position in the second direction where the first electrodes intersect with the other side of the third electrode, and a position in the second direction where the second electrode intersect with one side of the third electrode matches a position in the second direction where the second electrodes intersect with the other side of the third electrode.

2. The liquid crystal display device as claimed in claim 1, wherein:

the first electrodes are pixel electrodes to which a voltage according to each of the sub-pixels is applied; and the second electrodes and the third electrode are common electrodes to which a common voltage is applied to all the sub-pixels.

3. The liquid crystal display device as claimed in claim 2, wherein:

the first substrate is a TFT substrate in which a TFT is formed for each of the sub-pixels;

the second substrate is a color filter substrate in which a filter corresponding to the sub-pixel is formed;

the optical element is a lens array sheet constituted with a plurality of cylindrical lenses having axial direction in the first direction;

the TFT includes a gate, a source, and a drain; and the gate line is connected to the gate, the data line is connected to the source, and the pixel electrodes are connected to the drain.

4. The liquid crystal display device as claimed in claim 1, wherein:

the sub-pixels neighboring in the first direction have line-symmetrically reversed forms with respect to a line extending in parallel to the second direction which serves as an axis of symmetry, and the data line is disposed in a zigzag fashion in the first direction.

5. A liquid crystal display device, comprising: a first substrate; a second substrate; and a liquid crystal layer sandwiched between the first substrate and the second substrate, liquid crystal molecules thereof being controlled by an electric field that is almost in parallel to those substrates, wherein the liquid crystal display device includes: sub-pixels disposed in an array form in a first direction and a second direction orthogonal to each other;

an optical element which distributes light in the second direction;

a gate line disposed by being extended to the second direction;

a data line disposed to divide the sub-pixel obliquely at a position different from a boundary between the sub-pixels neighboring to each other in the second direction;

the sub-pixel includes an aperture section where light is transmitted;

the data line is disposed under a third electrode via the insulating film;

the third electrode and the data line have an intersection part intersecting with first electrodes and second electrodes;

the third electrode is disposed at a second angle with respect to the second direction at a portion excluding a neighboring portion of the intersection part, and disposed in a direction in parallel to the second direction at the neighboring portion of the intersection part;

at the intersection part, a position in the second direction where the first electrodes intersect with one side of the third electrode matches a position in the second direction where the first electrodes intersect with the other side of the third electrode, and a position in the second direction where the second electrode intersect with one side of the third electrode matches a position in the second direction where the second electrodes intersect with the other side of the third electrode.

6. The liquid crystal display device as claimed in claim 5, wherein:

the first electrodes are pixel electrodes to which a voltage according to each of the sub-pixels is applied; and the second electrodes and the third electrode are common electrodes to which a common voltage is applied to all the sub-pixels.

7. The liquid crystal display device as claimed in claim 6, wherein:

the first substrate is a TFT substrate in which a TFT is formed for each of the sub-pixels;

the second substrate is a color filter substrate in which a filter corresponding to the sub-pixel is formed;

the optical element is a lens array sheet constituted with a plurality of cylindrical lenses having axial direction in the first direction;

the TFT includes a gate, a source, and a drain; and the gate line is connected to the gate, the data line is connected to the source, and the pixel electrodes are connected to the drain.

8. The liquid crystal display device as claimed in claim 5, wherein:

the sub-pixels neighboring in the first direction have line-symmetrically reversed forms with respect to a line extending in parallel to the second direction which serves as an axis of symmetry, and the data line is disposed in a zigzag fashion in the first direction.

* * * * *